US010696099B2

(12) United States Patent
Suzuki

(10) Patent No.: US 10,696,099 B2
(45) Date of Patent: Jun. 30, 2020

(54) PNEUMATIC TIRE

(71) Applicant: The Yokohama Rubber Co., LTD., Minato-ku, Tokyo (JP)

(72) Inventor: Naoko Suzuki, Hiratsuka (JP)

(73) Assignee: The Yokohama Rubber Co., LTD. (JP)

( * ) Notice: Subject to any disclaimer, the term of this patent is extended or adjusted under 35 U.S.C. 154(b) by 282 days.

(21) Appl. No.: 15/746,389

(22) PCT Filed: Mar. 18, 2016

(86) PCT No.: PCT/JP2016/058839
§ 371 (c)(1),
(2) Date: Jan. 19, 2018

(87) PCT Pub. No.: WO2017/013902
PCT Pub. Date: Jan. 26, 2017

(65) Prior Publication Data
US 2018/0194171 A1 Jul. 12, 2018

(30) Foreign Application Priority Data
Jul. 22, 2015 (JP) .................. 2015-144796

(51) Int. Cl.
*B60C 11/03* (2006.01)
*B60C 11/12* (2006.01)
*B60C 11/13* (2006.01)

(52) U.S. Cl.
CPC .......... *B60C 11/0309* (2013.01); *B60C 11/03* (2013.01); *B60C 11/0302* (2013.01);
(Continued)

(58) Field of Classification Search
CPC . B60C 11/0309; B60C 11/03; B60C 11/0302; B60C 11/0304; B60C 11/12
See application file for complete search history.

(56) References Cited

U.S. PATENT DOCUMENTS 10,214,054 B2   2/2019   Murata
2010/0116392 A1 5/2010   Yamakawa
(Continued)

FOREIGN PATENT DOCUMENTS

| CN | 101758749 | 6/2010 |
|---|---|---|
| EP | 2 202 096 | 5/2016 |

(Continued)

OTHER PUBLICATIONS

International Search Report for International Application No. PCT/JP2016/058839 dated Jun. 21, 2016, 6 pages, Japan.

*Primary Examiner* — Jacob T Minskey
*Assistant Examiner* — Melody Tsui
(74) *Attorney, Agent, or Firm* — Thorpe North & Western

(57) ABSTRACT

A pneumatic tire includes first and second circumferential grooves, an intermediate land portion, wedge portions, intermediate land portion lug grooves, and a circumferential narrow groove. The circumferential grooves are provided in a tread surface. The intermediate land portion is formed between the circumferential grooves. The wedge portions are provided in the tire circumferential direction at the second circumferential groove and incline in the tire circumferential direction. The intermediate land portion lug grooves are provided with ends in communication with the circumferential grooves and divide the intermediate land portion into block portions in the tire circumferential direction. The circumferential narrow groove is configured with ends in communication with intermediate land portion lug grooves that are adjacent, divides each of the block portions between the intermediate land portion lug grooves, and has a groove width that increases and decreases between the intermediate land portion lug grooves that are adjacent.

16 Claims, 9 Drawing Sheets

(52) U.S. Cl.
CPC .......... *B60C 11/0304* (2013.01); *B60C 11/12* (2013.01); *B60C 11/13* (2013.01); *B60C 11/1392* (2013.01); *B60C 11/0332* (2013.01); *B60C 2011/036* (2013.01); *B60C 2011/0348* (2013.01); *B60C 2011/0365* (2013.01); *B60C 2011/0369* (2013.01); *B60C 2011/0381* (2013.01); *B60C 2011/0388* (2013.01); *B60C 2011/0393* (2013.01); *B60C 2011/1209* (2013.01); *B60C 2011/1213* (2013.01)

(56) References Cited

U.S. PATENT DOCUMENTS

| | | |
|---|---|---|
| 2012/0273104 A1 | 11/2012 | Ishida |
| 2015/0202928 A1 | 7/2015 | Akashi et al. |
| 2016/0214438 A1 | 7/2016 | Yamakawa |

FOREIGN PATENT DOCUMENTS

| | | | |
|---|---|---|---|
| JP | 06156019 A * | 6/1994 | ......... B60C 11/1263 |
| JP | H06-156019 | 6/1994 | |
| JP | 2008-307918 | 12/2008 | |
| JP | 2010-105552 | 5/2010 | |
| JP | 2010-149599 | 7/2010 | |
| JP | 2012-228992 | 11/2012 | |
| WO | WO 2008/152996 | 12/2008 | |
| WO | WO 2011/102264 | 8/2011 | |
| WO | WO 2014/077271 | 5/2014 | |
| WO | WO 2015/011964 | 1/2015 | |
| WO | WO 2015/033839 | 3/2015 | |

* cited by examiner

|  |  | Conventional Example | Comparative Example | Example 1 | Example 2 | Example 3 |
|---|---|---|---|---|---|---|
| First intermediate land portion | Presence of wedge portion | No | No | Yes | Yes | Yes |
|  | Land portion form (Lug groove form) | Rib | Rib | Block | Block | Block |
|  | Circumferential narrow groove | No | Yes | Yes | Yes | Yes |
|  | Relationship between wedge portion and circumferential narrow groove | - | - | Opposite incline | Same as incline | Same as incline |
|  | Wedge portion form | - | - | To groove bottom | To groove bottom | Chamfer |
|  | Lateral narrow groove | No | No | No | No | No |
|  | Position of second circumferential groove (Wedge portion position) | Opposite equatorial plane side | Opposite equatorial plane side | Opposite equatorial plane side | Opposite equatorial plane side | Opposite equatorial plane side |
| Center land portion shape (Lug grooves) |  | Block | Block | Block | Block | Block |
| Second intermediate land portion form (Lug grooves) |  | Rib | Rib | Rib | Rib | Rib |
| First shoulder land portion form (Main lug grooves) |  | Rib | Rib | Rib | Rib | Rib |
| First shoulder land portion form (Sub lug grooves) |  | Terminating end | Terminating end | Terminating end | Terminating end | Terminating end |
| Second shoulder land portion form (Lug grooves) |  | Block | Block | Block | Block | Block |
| Second shoulder land portion form (Lateral narrow groove) |  | No | No | No | No | No |
| Groove width of lateral narrow grooves |  | - | - | - | - | - |
| Braking performance on dry road surfaces |  | 100 | 101 | 101 | 101 | 102 |
| Braking performance on wet road surfaces |  | 100 | 100 | 101 | 101 | 102 |
| Braking performance on snow-covered road surfaces |  | 100 | 100 | 101 | 101 | 102 |

FIG. 8A

| | | Example 4 | Example 5 | Example 6 | Example 7 | Example 8 |
|---|---|---|---|---|---|---|
| First intermediate land portion | Presence of wedge portion | Yes | Yes | Yes | Yes | Yes |
| | Land portion form (Lug groove form) | Block | Block | Block | Block | Block |
| | Circumferential narrow groove | Yes | Yes | Yes | Yes | Yes |
| | Relationship between wedge portion and circumferential narrow groove | Same as incline | Same as incline | Same as incline | Same as incline | Same as incline |
| | Wedge portion form | Chamfer | Chamfer | Chamfer | Chamfer | Chamfer |
| | Lateral narrow groove | Yes | Yes | Yes | Yes | Yes |
| | Position of second circumferential groove (Wedge portion position) | Opposite equatorial plane side | Equatorial plane side | Equatorial plane side | Equatorial plane side | Equatorial plane side |
| Center land portion shape (Lug grooves) | | Block | Block | Rib | Rib | Rib |
| Second intermediate land portion form (Lug grooves) | | Rib | Rib | Rib | Block | Block |
| First shoulder land portion form (Main lug grooves) | | Rib | Rib | Rib | Rib | Block |
| First shoulder land portion form (Sub lug grooves) | | Terminating end | Terminating end | Terminating end | Terminating end | Terminating end |
| Second shoulder land portion form (Lug grooves) | | Block | Block | Block | Block | Block |
| Second shoulder land portion form (Lateral narrow groove) | | No | No | No | No | No |
| Groove width of lateral narrow grooves | | 0.2 | 0.2 | 0.2 | 0.2 | 0.2 |
| Braking performance on dry road surfaces | | 102 | 103 | 104 | 105 | 105 |
| Braking performance on wet road surfaces | | 103 | 103 | 104 | 105 | 105 |
| Braking performance on snow-covered road surfaces | | 102 | 103 | 104 | 104 | 105 |

FIG. 8B

|  |  | Example 9 | Example 10 | Example 11 | Example 12 | Example 13 |
|---|---|---|---|---|---|---|
| First intermediate land portion | Presence of wedge portion | Yes | Yes | Yes | Yes | Yes |
|  | Land portion form (Lug groove form) | Block | Block | Block | Block | Block |
|  | Circumferential narrow groove | Yes | Yes | Yes | Yes | Yes |
|  | Relationship between wedge portion and circumferential narrow groove | Same as incline | Same as incline | Same as incline | Same as incline | Same as incline |
|  | Wedge portion form | Chamfer | Chamfer | Chamfer | Chamfer | Chamfer |
|  | Lateral narrow groove | Yes | Yes | Yes | Yes | Yes |
|  | Position of second circumferential groove (Wedge portion position) | Equatorial plane side | Equatorial plane side | Equatorial plane side | Equatorial plane side | Equatorial plane side |
| Center land portion shape (Lug grooves) | | Rib | Rib | Rib | Rib | Rib |
| Second intermediate land portion form (Lug grooves) | | Block | Block | Block | Block | Block |
| First shoulder land portion form (Main lug grooves) | | Block | Block | Block | Block | Block |
| First shoulder land portion form (Sub lug grooves) | | Terminating end | Terminating end | Terminating end | Terminating end | Terminating end |
| Second shoulder land portion form (Lug grooves) | | Rib | Rib | Rib | Rib | Rib |
| Second shoulder land portion form (Lateral narrow groove) | | No | Yes | Yes | Yes | Yes |
| Groove width of lateral narrow grooves | | 0.2 | 0.2 | 0.4 | 1.5 | 1.0 |
| Braking performance on dry road surfaces | | 106 | 107 | 108 | 108 | 109 |
| Braking performance on wet road surfaces | | 106 | 106 | 107 | 109 | 109 |
| Braking performance on snow-covered road surfaces | | 105 | 106 | 107 | 109 | 110 |

FIG. 8C

PNEUMATIC TIRE

TECHNICAL FIELD

The present technology relates to a pneumatic tire that enhances braking performance on snow-covered road surfaces, wet road surfaces, and dry road surfaces.

BACKGROUND ART

For example, the pneumatic tire described in Japanese Unexamined Patent Application Publication No. 2012-228992 is designed to improve steering stability performance and noise performance. In the pneumatic tire, given that a pair of circumferential main grooves on an outermost side in a tire lateral direction are referred to as "shoulder main grooves", left and right land portions of land portions partitioned by the shoulder main grooves inward in the tire lateral direction are referred to as "second land portions", a first of the second land portions is referred to as an "outer side second land portion", and a second of the second land portions is referred to as an "inner side second land portion", the outer side second land portion includes a zigzag narrow groove having a zigzag shape, extending in the tire circumferential direction, and dividing the outer side second land portion in the tire lateral direction, and a plurality of sipes disposed at a predetermined pitch in the tire circumferential direction, extending from an edge portion outward in the tire lateral direction of the outer side second land portion toward the inner side in the tire lateral direction, and communicating with the zigzag narrow groove.

In general, to enhance the braking performance on snow-covered road surfaces, an edge effect is preferably improved. Thus, a groove having a zigzag shape may be provided as in the pneumatic tire of Japanese Unexamined Patent Application Publication No. 2012-228992 described above. Nevertheless, a groove having a zigzag shape tends to result in a loss in drainage characteristics due to a sinuous configuration, and therefore tends to cause a decrease in braking performance on wet road surfaces. Further, a groove having a zigzag shape, because of the acute angle portions formed on the land portions, results in a decrease in the rigidity of the land portions due to the shape of the surrounding land portions, and thus tends to decrease the braking performance on dry road surfaces.

SUMMARY

The present technology provides a pneumatic tire that can enhance braking performance on snow-covered road surfaces, wet road surfaces, and dry road surfaces.

A pneumatic tire according to an aspect of the present technology is provided with a first circumferential groove and a second circumferential groove, a first intermediate land portion, a plurality of wedge portions, a plurality of first intermediate land portion lug grooves, and a circumferential narrow groove. The first circumferential groove and the second circumferential groove are provided in a tread surface of a tread portion and extend in a tire circumferential direction. The first intermediate land portion is formed between the first circumferential groove and the second circumferential groove. The plurality of wedge portions are provided successively in the tire circumferential direction at the second circumferential groove and incline in the tire circumferential direction at least at an opening edge on the first intermediate land portion side of the second circumferential groove. The plurality of first intermediate land portion lug grooves are provided in the tire circumferential direction with both ends respectively in communication with the first circumferential groove and the second circumferential groove, and divide the first intermediate land portion into a plurality of block land portions in the tire circumferential direction. The circumferential narrow groove is configured with both ends respectively in communication with first intermediate land portion lug grooves of the plurality of first intermediate land portion lug grooves that are adjacent in the tire circumferential direction, divide each of the plurality of block land portions between the first intermediate land portion lug grooves in two in a tire lateral direction, have a groove width that increases and decreases between the first intermediate land portion lug grooves that are adjacent, and extend in the tire circumferential direction.

According to this pneumatic tire, it is possible to improve the braking performance on snow-covered road surfaces by the edge effect achieved by the wedge portions in the first intermediate land portion where the first circumferential groove and the second circumferential groove are formed. Moreover, with the first intermediate land portion divided into a plurality of block land portions in the tire circumferential direction by the first intermediate land portion lug grooves, the edge effect and the drainage characteristics are improved, making it possible to improve the braking performance on snow-covered road surfaces as well as the braking performance on wet road surfaces. Moreover, with the provision of the circumferential narrow grooves having a groove width that increases and decreases between the first intermediate land portion lug grooves and extending in the tire circumferential direction, it is possible to improve the braking performance on snow-covered road surfaces by the edge effect achieved by the increase and decrease of the groove width as well as improve the braking performance on wet road surfaces by improvements in drainage characteristics.

Further, in the pneumatic tire according to an aspect of the present technology, the plurality of first intermediate land portion lug grooves are each disposed at each of the plurality of wedge portions of the second circumferential groove, and the circumferential narrow groove is provided so that the groove width of the circumferential narrow groove increases and decreases along an incline of each of the plurality of wedge portions between the first intermediate land portion lug grooves.

According to this pneumatic tire, the shape on the tread surface of the land portions surrounded by the first intermediate land portion lug groove, the wedge portion of the second circumferential groove, and the circumferential narrow groove is substantially close to a parallelogram, making it possible to make the rigidity of the land portions uniform and thus suppress a decrease in the braking performance on dry road surfaces.

Further, in the pneumatic tire according to an aspect of the present technology, the plurality of wedge portion are formed by a chamfer provided to the opening edge of the second circumferential groove.

According to this pneumatic tire, the wedge portion is formed by a chamfer, thereby suppressing a volume decrease in the land portions while achieving the edge effect, making it possible to suppress a decrease in rigidity as well as achieve good braking performance on snow-covered road surfaces and dry road surfaces in a compatible manner.

Further, the pneumatic tire according to an aspect of the present technology further includes a lateral narrow groove dividing each of the plurality of block land portions between the first intermediate land portion lug grooves in two in the tire circumferential direction.

According to this pneumatic tire, it is possible to improve the braking performance on snow-covered road surfaces by the edge effect of the lateral narrow groove, and improve the braking performance on wet road surfaces by improvements in drainage characteristics.

Further, in the pneumatic tire according to an aspect of the present technology, the second circumferential groove is disposed on a side of the first circumferential groove that is near a tire equatorial plane.

With the second circumferential groove disposed near the tire equatorial plane, the effect of improving the braking performance on snow-covered road surfaces achieved by the edge effect of the wedge portion can be more remarkably achieved. Thus, with the second circumferential groove provided with the wedge portion being disposed on the side near the tire equatorial plane, an effect of improving the braking performance on snow-covered road surfaces can be remarkable achieved.

Further, the pneumatic tire according to an aspect of the present technology further includes a third circumferential groove, a center land portion, a plurality of center land portion first lug grooves, and a plurality of center land portion second lug grooves. The third circumferential groove is provided adjacent to the tire equatorial plane side of the second circumferential groove. The center land portion is formed on the tire equatorial plane by the third circumferential groove, between the second circumferential groove and the third circumferential groove, with the second circumferential groove disposed on a side near the tire equatorial plane. The plurality of center land portion first lug grooves are each provided in the tire circumferential direction with a first end in communication with the second circumferential groove and a second end terminating inside the center land portion. The plurality of center land portion second lug grooves are each provided in the tire circumferential direction with a first end in communication with the third circumferential groove and a second end terminating inside the center land portion. The plurality of center land portion first lug grooves and the plurality of center land portion second lug grooves are alternately disposed in the tire circumferential direction without communicating.

According to this pneumatic tire, the center land portion first lug grooves and the center land portion second lug grooves provided so as to terminate at the center land portion provided on the tire equatorial plane are alternately disposed in the tire circumferential direction without communicating, thereby forming the center land portion into a rib-like shape. As a result, a decrease in the rigidity of the center land portion, which contributes to improvement in braking performance on dry road surfaces, is suppressed, making it possible to improve the braking performance on dry road surfaces.

Further, the pneumatic tire according to an aspect of the present technology further includes a fourth circumferential groove, a second intermediate land portion, and a plurality of second intermediate land portion lug grooves. The fourth circumferential groove is provided outwardly adjacent to the third circumferential groove in the tire lateral direction. The second intermediate land portion is formed by the fourth circumferential groove, between the third circumferential groove and the fourth circumferential groove. The plurality of second intermediate land portion lug grooves are provided in the tire circumferential direction with both ends respectively in communication with the third circumferential groove and the fourth circumferential groove, and divide the second intermediate land portion into a plurality of block land portions in the tire circumferential direction.

According to this pneumatic tire, the first intermediate land portion and the second intermediate land portion formed on both sides in the tire lateral direction of the center land portion on the tire equatorial plane are each formed so as to be divided into block land portions, thereby making it possible to improve the braking performance on snow-covered road surfaces by the edge effect as well as the braking performance on wet road surfaces by the water drainage effect, suppress an extreme rigidity difference between the land portions sandwiching the center land portion by mutual block land portions, and thus ensure the braking performance on dry road surfaces.

Further, the pneumatic tire according to an aspect of the present technology further includes a first shoulder land portion, a plurality of first shoulder land portion main lug grooves, and a first shoulder land portion sub lug groove. The first shoulder land portion is formed outward of the fourth circumferential groove in the tire lateral direction. The plurality of first shoulder land portion main lug grooves are each provided in the tire circumferential direction with a first end passing completely through the first shoulder land portion and opening outward to the tread surface in the tire lateral direction, and a second end in communication with the fourth circumferential groove. The first shoulder land portion sub lug groove is provided between adjacent first shoulder land portion main lug grooves of the plurality of first shoulder land portion main lug grooves in the tire circumferential direction with a first end in communication with the fourth circumferential groove and a second end terminating inside the first shoulder land portion.

According to this pneumatic tire, in the first shoulder land portion, the first shoulder land portion sub lug grooves are provided between the first shoulder land portion main lug grooves adjacent in the tire circumferential direction in addition to the plurality of first shoulder land portion main lug grooves provided in the tire circumferential direction, making it possible to improve the braking performance on snow-covered road surfaces by the mutual edge effect as well as improve the braking performance on wet road surfaces by the mutual water drainage effect of the lug grooves.

Further, the pneumatic tire according to an aspect of the present technology further includes a second shoulder land portion, a plurality of second shoulder land portion lug grooves, and at least one lateral narrow groove. The second shoulder land portion is formed outward of the first circumferential groove in the tire lateral direction with the first circumferential groove of the first circumferential groove and the second circumferential groove disposed outward in the tire lateral direction. The plurality of second shoulder land portion lug grooves are each provided in the tire circumferential direction with a first end passing completely through the second shoulder land portion and opening outward to the tread surface in the tire lateral direction and a second end terminating inside the second shoulder land portion. The at least one lateral narrow groove intersects the tire circumferential direction between adjacent second shoulder land portion lug grooves of the plurality of second shoulder land portion lug grooves in the tire circumferential direction.

According to this pneumatic tire, in the second shoulder land portion, the lateral narrow groove is provided between the second shoulder land portion lug grooves adjacent in the tire circumferential direction in addition to the plurality of second shoulder land portion lug grooves provided in the tire circumferential direction, making it possible to improve the braking performance on snow-covered road surfaces by the mutual edge effect and improve the braking performance on wet road surfaces by the mutual water drainage effect of the second shoulder land portion lug grooves and the lateral narrow groove.

Further, in the pneumatic tire according to an aspect of the present technology, each of the lateral narrow grooves has a groove width not less than 0.4 mm and not greater than 1.5 mm.

When the groove width of the lateral narrow groove is less than 0.4 mm, the drainage performance tends to decrease, and when the groove width exceeds 1.5 mm, the rigidity of the land portions tends to decrease. Thus, the groove width of the lateral narrow groove is preferably not less than 0.4 mm and not greater than 1.5 mm.

With the pneumatic tire according to the present technology, braking performance can be enhanced on snow-covered road surfaces, wet road surfaces, and dry road surfaces.

BRIEF DESCRIPTION OF DRAWINGS

FIGS. 8A-8C include tables showing results of performance testing of pneumatic tires according to examples of the present technology.

DETAILED DESCRIPTION

Embodiments of the present technology are described in detail below on the basis of the drawings. However, the present technology is not limited to these embodiments. Constituents of the embodiments include elements that can be easily replaced by those skilled in the art and elements substantially the same as the constituents of the embodiments. Furthermore, the modified examples described in the embodiments can be combined as desired within the scope apparent to those skilled in the art.

Figure 1:
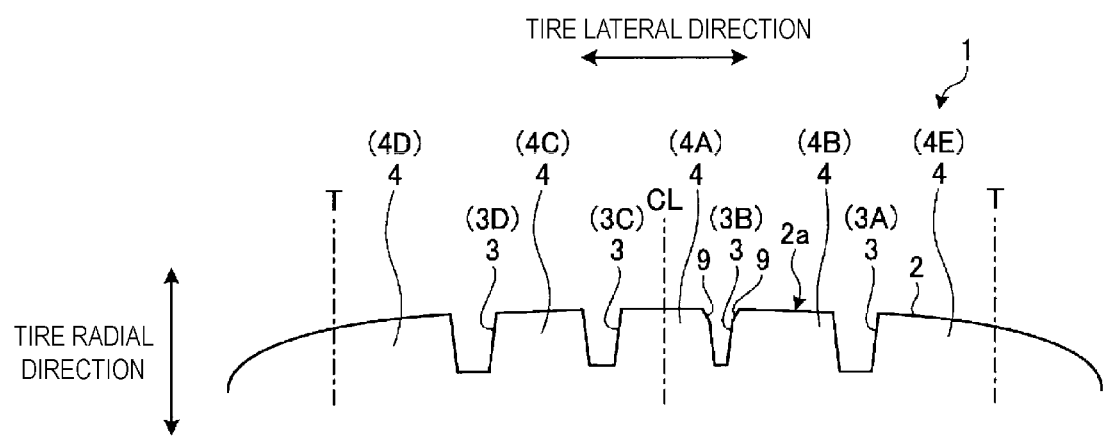
FIG. 1 is a meridian cross-sectional view of a tread portion of a pneumatic tire according to an embodiment of the present technology.
Figure 2:
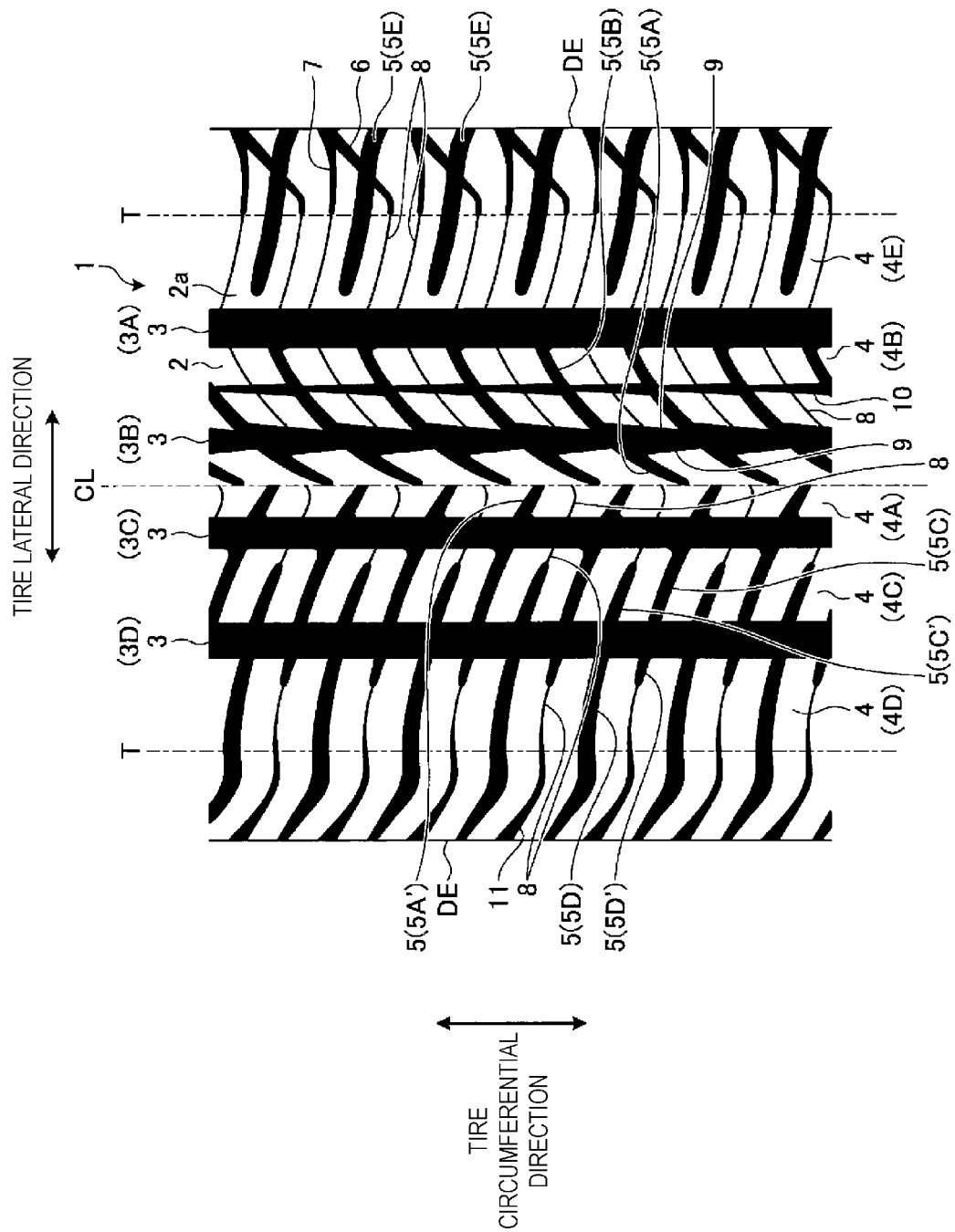
FIG. 2 is a plan view of the tread portion of the pneumatic tire according to the embodiment of the present technology.

FIG. 1 is a meridian cross-sectional view of a tread portion of a pneumatic tire according to the present embodiment. FIG. 2 is a plan view of the tread portion of the pneumatic tire according to the present embodiment.

Herein, "tire circumferential direction" refers to the circumferential direction with a rotation axis (not illustrated) of a pneumatic tire 1 as the center axis. Additionally, "tire lateral direction" refers to the direction parallel with the rotation axis. "Inward in the tire lateral direction" refers to the direction toward a tire equatorial plane (tire equator line) CL in the tire lateral direction. "Outward in the tire lateral direction" refers to the direction away from the tire equatorial plane CL in the tire lateral direction. Furthermore, "tire radial direction" refers to the direction orthogonal to the rotation axis. "Inward in the tire radial direction" refers to the direction toward the rotation axis in the tire radial direction. "Outward in the tire radial direction" refers to the direction away from the rotation axis in the tire radial direction. "Tire equatorial plane CL" refers to the plane orthogonal to the rotation axis and that passes through the center of the tire width of the pneumatic tire 1. "Tire equator line" refers to the line along the tire circumferential direction of the pneumatic tire 1 that lies on the tire equatorial plane CL. In the present embodiment, the tire equator line and the tire equatorial plane are both denoted by reference sign CL.

As illustrated in FIGS. 1 and 2, the pneumatic tire 1 according to the present embodiment includes the tread portion 2. The tread portion 2 is formed from a rubber material, is exposed on the outermost side in the tire radial direction of the pneumatic tire 1, and the surface thereof constitutes the profile of the pneumatic tire 1 as a tread surface 2a.

The tread portion 2 includes a plurality of circumferential grooves 3 (four in the present embodiment) extending in the tire circumferential direction. The circumferential grooves 3 are disposed side by side in the tire lateral direction in the tread surface 2a. Of these circumferential grooves 3, the circumferential groove 3 on a first side (the right side in FIGS. 1 and 2) is a first circumferential groove 3A, and the circumferential grooves 3 sequentially from the first circumferential groove 3A toward a second side (the left side in FIGS. 1 and 2) are a second circumferential groove 3B, a third circumferential groove 3C, and a fourth circumferential groove 3D. Then, the first circumferential groove 3A and the second circumferential groove 3B are disposed outward in the tire lateral direction on the first side (the right side in FIGS. 1 and 2), of the tire equatorial plane CL, and the third circumferential groove 3C and the fourth circumferential groove 3D are disposed outward in the tire lateral direction on the second side (the left side in FIGS. 1 and 2) of the tire equatorial plane CL. Note that the circumferential grooves 3 have, for example, a groove width not less than 5 mm and not greater than 15 mm, and a groove depth (dimension from an opening position on the tread surface 2a to a groove bottom) not less than 5 mm and not greater than 15 mm.

A plurality of land portions 4 (five in the present embodiment) are defined on the tread surface 2a of the tread portion 2 by the circumferential grooves 3. Then, the land portion 4 on the tire equatorial plane CL between the second circumferential groove 3B and the third circumferential groove 3C is referred to as the center land portion 4A. Also, the land portion 4 outwardly adjacent to the first side of the center land portion 4A in the tire lateral direction, between the first circumferential groove 3A and the second circumferential groove 3B, is referred to as the first intermediate land portion 4B. Also, the land portion 4 outwardly adjacent to the second side of the center land portion 4A in the tire lateral direction, between the third circumferential groove 3C and the fourth circumferential groove 3D, is referred to as the second intermediate land portion 4C. Also, the land portion 4 outward of the fourth circumferential groove 3D in the tire lateral direction, outwardly adjacent to the second intermediate land portion 4C in the tire lateral direction and on the outermost side in the tire lateral direction is referred to as the first shoulder land portion 4D. Also, the land portion 4 outward of the first circumferential groove 3A in the tire lateral direction, outwardly adjacent to the first intermediate land portion 4B in the tire lateral direction, and on the outermost side in the tire lateral direction is referred to as the second shoulder land portion 4E.

Further, in the tread portion 2, ground contact edges T exist on the first shoulder land portion 4D and on the second shoulder land portion 4E, which are the land portions 4 on the outermost sides in the tire lateral direction. Further, in the tread portion 2, outer side ends in the tire lateral direction of the first shoulder land portion 4D and the second shoulder land portion 4E, which are the land portions 4 on the outermost side in the tire lateral direction, are referred to as design ends DE.

Here, "ground contact edge T" refers to both outermost edges in the tire lateral direction of the ground contact region and, in FIG. 2, is continuously illustrated in the tire circumferential direction. The ground contact region is the region where the tread surface 2a of the tread portion 2 of the pneumatic tire 1 comes into contact with a dry, flat road surface, when the pneumatic tire 1 is mounted on a regular rim, inflated to the regular internal pressure, and loaded with 70% of the regular load. Here, "regular rim" refers to a "standard rim" defined by the Japan Automobile Tyre Manufacturers Association Inc. (JATMA), a "design rim" defined by the Tire and Rim Association, Inc. (TRA), or a "measuring rim" defined by the European Tyre and Rim Technical Organisation (ETRTO). "Regular internal pressure" refers to a "maximum air pressure" defined by JATMA, a maximum value given in "TIRE LOAD LIMITS AT VARIOUS COLD INFLATION PRESSURES" defined by TRA, or "INFLATION PRESSURES" defined by ETRTO. "Regular load" refers to a "maximum load capacity" defined by JATMA, the maximum value given in "TIRE LOAD LIMITS AT VARIOUS COLD INFLATION PRESSURES" defined by TRA, and a "LOAD CAPACITY" defined by ETRTO. Further, "design end DE" refers to each of the outer sides in the tire lateral direction of the ground contact edges T, the outermost ends in the tire lateral direction of the tread portion 2, and the outermost ends in the tire lateral direction where the grooves are formed in the tread portion 2. The design ends DE are illustrated continuously in the tire circumferential direction in FIG. 2. That is, on a dry, flat road surface, the regions of the tread portion 2 on the design end DE sides of the ground contact edges T are regions that normally do not come into contact with the road surface.

The pneumatic tire 1 of the present embodiment includes the first intermediate land portion 4B, and this first intermediate land portion 4B is mainly described below.

Figure 3:
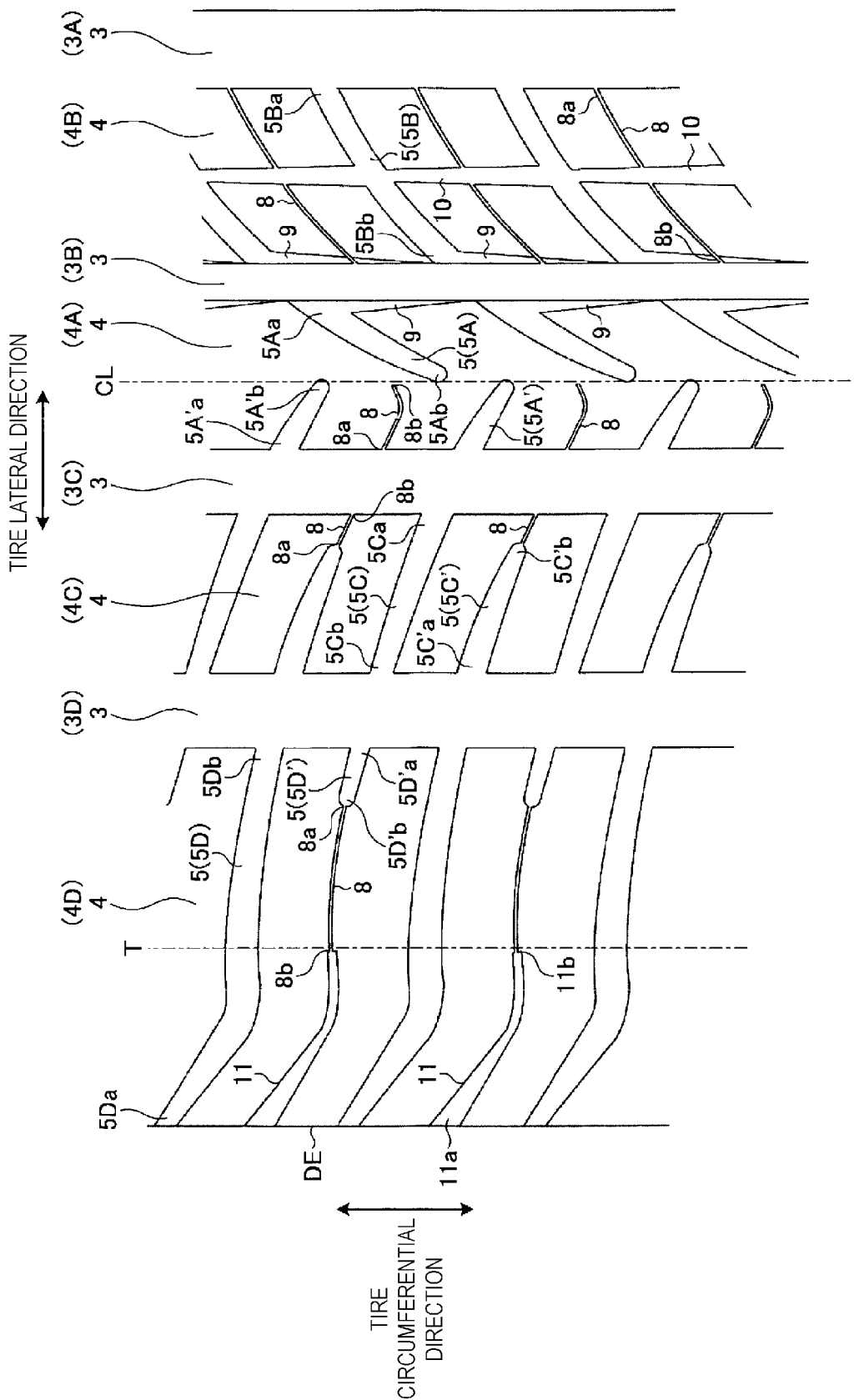
FIG. 3 is a partial enlarged plan view of the tread portion of the pneumatic tire according to the embodiment of the present technology.

FIG. 3 is a partial enlarged plan view of the tread portion of the pneumatic tire according to the present embodiment. FIG. 3 is an enlarged view mainly illustrating the first intermediate land portion 4B.

As illustrated in FIGS. 2 and 3, the first intermediate land portion 4B is formed between the first circumferential groove 3A and the second circumferential groove 3B.

The first circumferential groove 3A is formed linearly in the tire circumferential direction, and has a groove width that does not change in the tire circumferential direction.

The second circumferential groove 3B is provided with a wedge portion 9. A plurality of the wedge portions 9 are provided successively in the tire circumferential direction, with one at each of the opening edges on the first intermediate land portion 4B side and the center land portion 4A side of the second circumferential groove 3B, and are inclined in the tire circumferential direction so as to increase and decrease the opening of the second circumferential groove 3B. The plurality of wedge portions 9 have the same inclination direction at the opening edges on the first intermediate land portion 4B side, and the same inclination direction at the opening edges on the center land portion 4A side. Further, at each opening edge on the first intermediate land portion 4B side and each opening edge on the center land portion 4A side, the wedge portions 9 are provided facing each other in the tire lateral direction with the inclination directions thereof opposite each other. Thus, in the second circumferential groove 3B, the wedge portions 9 are each provided so that an opening width (groove width) of the second circumferential groove 3B alternately narrows and widens in the tire circumferential direction, which is an extension direction of the second circumferential groove 3B. Further, the wedge portions 9, as illustrated in FIG. 1, are each formed by a chamfer obtained by shaving the opening edge of the second circumferential groove 3B on a triangular shaped face, and configured so that the groove width of the second circumferential groove 3B does not change other than at the opening edge. Further, the wedge portions 9, while not illustrated, are each formed so that a groove wall of the second circumferential groove 3B extends from the groove bottom to the opening edge, and a groove width increases and decreases. Note that this wedge portion 9 is preferably provided on at least the opening edge on the first intermediate land portion 4B side of the second circumferential groove 3B. The second circumferential groove 3B provided with this wedge portion 9 is disposed on a side of the first circumferential groove 3A that is near the tire equatorial plane CL.

A circumferential narrow groove 10, a lug groove 5, and a lateral narrow groove 8 are formed in the first intermediate land portion 4B.

The lug grooves 5 of the first intermediate land portion 4B are each provided so as to intersect the tire circumferential direction, and are referred to as the first intermediate land portion lug grooves 5B in the present embodiment. The first intermediate land portion lug grooves 5B each include a first end 5Ba that communicates with the first circumferential groove 3A, and a second end 5Bb that communicates with the second circumferential groove 3B. The first intermediate land portion lug grooves 5B are provided so as to be separated from each other in the tire circumferential direction. Further, the first intermediate land portion lug grooves 5B are provided so as to extend substantially in parallel with and not intersect each other. Then, each of the first intermediate land portion lug grooves 5B divides the first intermediate land portion 4B into a plurality of block land portions in the tire circumferential direction. Such a first intermediate land portion lug groove 5B, as illustrated in FIGS. 2 and 3, is preferably disposed at each of the increasing and decreasing wedge portions 9, between each of the wedge portions 9, but may be disposed midway on the incline of the wedge portion 9 and not at each wedge portion 9 (not illustrated).

The circumferential narrow groove 10 is provided so as to pass completely through the first intermediate land portion lug grooves 5B adjacent to each other in the tire circumferential direction, extending in each tire circumferential direction. The circumferential narrow groove 10 is formed so that, between adjacent first intermediate land portion lug grooves 5B, both ends in the tire circumferential direction communicate with the first intermediate land portion lug grooves 5B, evenly dividing the block land portions formed between the adjacent first intermediate land portion lug grooves 5B in two in the tire lateral direction. Further, the circumferential narrow groove 10 is provided so that the groove width increases and decreases in the tire circumferential direction between adjacent first intermediate land portion lug grooves 5B. This circumferential narrow groove 10 is formed so that the groove wall extends from the groove bottom to the opening edge, and the groove width increases and decreases. Further, the circumferential narrow groove 10 is provided so as to extend from the first intermediate land portion lug groove 5B on a first side to the first intermediate land portion lug groove 5B on a second side in the block land portion between the adjacent first intermediate land portion lug grooves 5B, and uniformly increases or decreases in groove width in one direction of the tire circumferential direction from a first end to a second end without reversing the increase or decrease midway. Then, when the first intermediate land portion lug grooves 5B are disposed between the wedge portions 9, the incline of the circumferential narrow groove 10 formed by the increasing or decreasing groove width is provided in the same direction along the incline of the wedge portion 9, thereby dividing the second circumferential groove 3B side of the block land portions formed between the first intermediate land portion lug grooves 5B substantially into parallelograms. Further, when the groove width uniformly increases or decreases in one direction of the tire circumferential direction, the circumferential narrow groove 10 is formed so that the groove depth decreases as the groove width decreases. Note that, when the wedge portions 9 of the second circumferential groove 3B are each formed by a chamfer, the wedge portions 9 are provided at a position shallower than the groove depth of the circumferential narrow groove 10, and closer to the tread surface 2a than to the groove bottom of the circumferential narrow groove 10.

The lateral narrow grooves 8 of the first intermediate land portion 4B each evenly divide the block land portion formed between the adjacent first intermediate land portion lug grooves 5B in two in the tire circumferential direction. The lateral narrow grooves 8, as illustrated in FIGS. 2 and 3, each intersect the circumferential narrow groove 10 at a center in the tire circumferential direction of the adjacent first intermediate land portion lug grooves 5B, and include a first end 8a that communicates with the first circumferential groove 3A, and a second end 8b that communicates with the second circumferential groove 3B. As a result, the lateral narrow grooves 8 each divide the block land portion formed between the adjacent first intermediate land portion lug grooves 5B in two in the tire circumferential direction. Note that the lateral narrow grooves 8, while not illustrated, may each be formed so as to intersect the circumferential narrow groove 10 with the first end 8a in communication with one of the adjacent first intermediate land portion lug groove 5B, and the second end 8b in communication with the other of the adjacent first intermediate land portion lug groove 5B, thereby dividing the block land portion between the adjacent first intermediate land portion lug grooves 5B in two in the tire circumferential direction.

Also, as illustrated in FIGS. 2 and 3, the center land portion 4 is formed on the tire equatorial plane CL between the second circumferential groove 3B and the third circumferential groove 3C.

The third circumferential groove 3C is formed linearly in the tire circumferential direction, and has a groove width that does not change in the tire circumferential direction.

The lug groove 5 and the lateral narrow groove 8 are formed in the center land portion 4A.

The lug grooves 5 of the center land portion 4A are provided so as to intersect the tire circumferential direction, and are referred to as the center land portion first lug grooves 5A and the center land portion second lug grooves 5A' in the present embodiment. The center land portion first lug grooves 5A each include a first end 5Aa that communicates with the second circumferential groove 3B, and a second end 5Ab that terminates inside the center land portion 4A. The center land portion first lug grooves 5A are provided so as to be separated from each other in the tire circumferential direction. Further, the center land portion first lug grooves 5A are provided so as to extend substantially in parallel with and not intersect each other. The center land portion first lug grooves 5A are each provided so that the first end 5Aa faces the second end 5Bb of the first intermediate land portion lug groove 5B at the second circumferential groove 3B, and thus passes completely through the second circumferential groove 3B integrally with the first intermediate land portion lug groove 5B in a plan view.

The center land portion second lug grooves 5A' each include a first end 5A'a that communicates with the third circumferential groove 3C, and a second end 5A'b that terminates inside the center land portion 4A. The center land portion second lug grooves 5A' are provided so as to be separated from each other in the tire circumferential direction. Further, the center land portion second lug grooves 5A' are provided so as to extend substantially in parallel with and not intersect each other.

The center land portion first lug grooves 5A and the center land portion second lug grooves 5A' are alternately disposed in the tire circumferential direction without communicating with each other. As a result, the center land portion 4A is configured as a rib-like land portion that continues in the tire circumferential direction. Note that the second ends 5Ab, 5A'b of the center land portion first lug groove 5A and the center land portion second lug grooves 5A' terminate on the tire equatorial plane CL or at a position that does not intersect the tire equatorial plane CL.

The lateral narrow grooves 8 of the center land portion 4A are formed so that the first end 8a communicates with the third circumferential groove 3C, and the second end 8b terminates inside the center land portion 4A. Further, the lateral narrow grooves 8 are provided so that there is one between the center land portion second lug grooves 5A' adjacent in the tire circumferential direction, each extending substantially in parallel with the center land portion second lug grooves 5A' without intersecting the center land portion second lug groove 5A' or the center land portion first lug groove 5A. Note that the second end 8b of the lateral narrow groove 8 terminates on the tire equatorial plane CL or at a position that does not intersect the tire equatorial plane CL.

Further, as illustrated in FIGS. 2 and 3, the second intermediate land portion 4C is formed between the third circumferential groove 3C and the fourth circumferential groove 3D.

The fourth circumferential groove 3D is formed linearly in the tire circumferential direction, and has a groove width that does not change in the tire circumferential direction. Note that the fourth circumferential groove 3D is the circumferential groove 3 on the outermost side in the tire lateral direction of the tire equatorial plane CL along with the first circumferential groove 3A, and is formed to substantially the same groove width. Further, the fourth circumferential groove 3D and the first circumferential groove 3A are formed so that the respective groove widths are larger than those of the second circumferential groove 3B and the third circumferential groove 3C inward in the tire lateral direction. Further, because of the formation of the wedge portions 9, the second circumferential groove 3B is formed so that the groove width is smaller than that of the third circumferential groove 3C.

The lug groove 5 and the lateral narrow grooves 8 are formed in the second intermediate land portion 4C.

The lug grooves 5 of the second intermediate land portion 4C are provided so as to intersect the tire circumferential direction, and are includes the second intermediate land portion main lug grooves (second intermediate land portion lug grooves) 5C and the second intermediate land portion sub lug grooves 5C' in the present embodiment. The second intermediate land portion main lug grooves 5C each include a first end 5Ca that communicates with the third circumferential groove 3C, and a second end 5Cb that communicates with the fourth circumferential groove 3D. The second intermediate land portion main lug grooves 5C are provided so as to be separated from each other in the tire circumferential direction. Further, the second intermediate land portion main lug grooves 5C are provided so as to extend substantially in parallel with and not intersect each other. Then, each of the second intermediate land portion main lug grooves 5C divides the second intermediate land portion 4C into a plurality of block land portions in the tire circumferential direction. The second intermediate land portion main lug grooves 5C are each provided so that the first end 5Ca faces the first end 5A'a of the center land portion second lug groove 5A' at the third circumferential groove 3C, and thus passes completely through the third circumferential groove 3C integrally with the center land portion second lug groove 5A' in a plan view.

The second intermediate land portion sub lug grooves 5C' each include a first end 5C'a that communicates with the fourth circumferential groove 3D, and a second end 5C'b that terminates inside the second intermediate land portion 4C. Further, the second intermediate land portion sub lug grooves 5C' are provided so that there is one between the second intermediate land portion main lug grooves 5C adjacent in the tire circumferential direction, and each extends substantially in parallel with the second intermediate land portion main lug grooves 5C without intersecting the second intermediate land portion main lug grooves 5C.

The lateral narrow grooves 8 of the second intermediate land portion 4C are formed so that the first end 8a communicates with a terminating end of the second end 5C'b of the second intermediate land portion sub lug groove 5C', and the second end 8b communicates with third circumferential groove 3C. The lateral narrow grooves 8 are each provided so that the second end 8b faces the first end 8a of the lateral narrow groove 8 of the center land portion 4A at the third circumferential groove 3C, and thus integrally pass completely through the third circumferential groove 3C in a plan view.

Further, as illustrated in FIGS. 2 and 3, the first shoulder land portion 4D is formed outward of the fourth circumferential groove 3D in the tire lateral direction.

The lug groove 5, a shoulder land portion narrow groove 11, and the lateral narrow groove 8 are formed in the first shoulder land portion 4D.

The lug grooves 5 of the first shoulder land portion 4D are provided so as to intersect the tire circumferential direction, and include the first shoulder land portion main lug grooves 5D and the first shoulder land portion sub lug grooves 5D' in the present embodiment. The first shoulder land portion main lug grooves 5D each include a first end 5Da outward in the tire lateral direction and extending and opening to the design end DE, and a second end 5Db that communicates with the fourth circumferential groove 3D. The first shoulder land portion main lug grooves 5D are provided so as to be separated from each other in the tire circumferential direction. Further, the first shoulder land portion main lug grooves 5D are provided so as to extend substantially in parallel with and not intersect each other. Then, each of the first shoulder land portion main lug grooves 5D divides the first shoulder land portion 4D into a plurality of block land portions in the tire circumferential direction. The first shoulder land portion main lug grooves 5D are each provided so that the second end 5Db faces the first end 5C'a of the second intermediate land portion sub lug groove 5C' at the fourth circumferential groove 3D, and thus passes completely through the fourth circumferential groove 3D integrally with the second intermediate land portion sub lug groove 5C' in a plan view. That is, the first shoulder land portion main lug grooves 5D, the second intermediate land portion sub lug groove 5C', the lateral narrow groove 8 of the second intermediate land portion 4C, and the lateral narrow groove 8 of the center land portion 4A are provided so as to integrally pass completely through the fourth circumferential groove 3D and the third circumferential groove 3C from the design end DE.

The first shoulder land portion sub lug groove 5D' each include a first end 5D'a that communicates with the fourth circumferential groove 3D, and a second end 5D'b that terminates inside the first shoulder land portion 4D. Further, the first shoulder land portion sub lug grooves 5D' are provided so that there is one between the first shoulder land portion main lug grooves 5D adjacent in the tire circumferential direction, and each extends substantially in parallel with the first shoulder land portion main lug grooves 5D without intersecting the first shoulder land portion main lug grooves 5D. The first shoulder land portion sub lug grooves 5D' are each provided so that the first end 5D'a faces the second end 5Cb of the second intermediate land portion main lug groove 5C at the fourth circumferential groove 3D, and thus passes completely through the fourth circumferential groove 3D integrally with the second intermediate land portion main lug groove 5C in a plan view.

The shoulder land portion narrow grooves 11 each include a first end 11a outward in the tire lateral direction and extending and opening to the design end DE, and a second end 11b that terminates inside the first shoulder land portion 4D and does not communicate with the fourth circumferential groove 3D. While, in the present embodiment, preferably the shoulder land portion narrow grooves 11 are each formed so that the second end 11b terminates outward of the ground contact edge T in the tire lateral direction, and the entirety of each of the shoulder land portion narrow grooves 11 is provided outward of the ground contact edge T in the tire lateral direction, the second end 11b may be provided so as to terminate inward of the ground contact edge T in the tire lateral direction. Further, the shoulder land portion narrow grooves 11 are provided so that there is one between the first shoulder land portion main lug grooves 5D adjacent in the tire circumferential direction, and each extends substantially in parallel with the first shoulder land portion main lug grooves 5D without intersecting the first shoulder land portion main lug grooves 5D.

The lateral narrow grooves 8 of the first shoulder land portion 4D are each formed so that the first end 8a communicates with a terminating end of the second end 5D'b of the first shoulder land portion sub lug groove 5D', and the second end 8b communicates with a terminating end of the second end 11b of the shoulder land portion narrow groove 11. That is, the shoulder land portion narrow groove 11, the lateral narrow groove 8 of the first shoulder land portion 4D, the first shoulder land portion sub lug groove 5D', the second intermediate land portion main lug groove 5C, and the center land portion second lug groove 5A' are provided so as to integrally pass completely through the fourth circumferential groove 3D and the third circumferential groove 3C.

Here, in the present embodiment, the lug grooves 5 have, for example, a groove width not less than 1.5 mm and not greater than those of the circumferential grooves 3, and a groove depth not greater than those of the circumferential grooves 3. Further, the circumferential narrow grooves 10 and the shoulder land portion narrow grooves 11 each have a groove width not greater than 4.0 mm (preferably not less than 1.0 mm and not greater than 4.0 mm) and a groove depth not greater than those of the circumferential grooves 3, for example. Further, the lateral narrow grooves 8 each have a groove width not less than 0.4 mm and not greater than 1.5 mm and not greater than those of the circumferential narrow groove 10 and the shoulder land portion narrow grooves 11, and a groove depth not greater than those of the circumferential grooves 3 and the lug grooves 5, for example. Note that, when the groove depth changes in the circumferential narrow groove 10 and the shoulder land portion narrow groove 11, the deepest groove depth is set within the range described above.

The lateral narrow grooves 8 communicate with the circumferential narrow grooves 10 and the shoulder land portion narrow grooves 11, and thus the groove width and the groove depth of this communicating portion is defined by the change in groove width. Further, while the lateral narrow grooves 8, the circumferential narrow grooves 10, and the shoulder land portion narrow grooves 11 may have the same groove depth in the communicating portion, the groove depths of the circumferential narrow grooves 10 and the shoulder land portion narrow grooves 11 may be formed so as to be greater than those of the lateral narrow grooves 8.

Thus, the pneumatic tire 1 of the present embodiment is provided with the first circumferential groove 3A and the second circumferential groove 3B, the first intermediate land portion 4B, the plurality of wedge portions 9, the plurality of first intermediate land portion lug grooves 5B, and the circumferential narrow grooves 10. The first circumferential groove 3A and the second circumferential groove 3B are provided in the tread surface 2a of the tread portion 2 and extend in the tire circumferential direction. The first intermediate land portion 4B is formed between the circumferential grooves 3A, 3B. The plurality of wedge portions 9 are provided successively in the tire circumferential direction at the second circumferential groove 3B and incline in the tire circumferential direction at least at the opening edge on the first intermediate land portion 4B side of the second circumferential groove 3B. The plurality of first intermediate land portion lug grooves 5B are provided in the tire circumferential direction with both ends respectively in communication with the circumferential grooves 3A, 3B, and divide the first intermediate land portion 4B into the plurality of block land portions in the tire circumferential direction. The circumferential narrow grooves 10 are configured with both ends respectively in communication with the first intermediate land portion lug grooves 5B adjacent in the tire circumferential direction, divide the block land portions between the first intermediate land portion lug grooves 5B in two in the tire lateral direction, have a groove width that increases and decreases between adjacent first intermediate land portion lug grooves 5B, and extend in the tire circumferential direction.

According to this pneumatic tire 1, it is possible to improve the braking performance on snow-covered road surfaces by the edge effect achieved by the wedge portions 9 in the first intermediate land portion 4B where the first circumferential groove 3A and the second circumferential groove 3B are formed. Moreover, with the first intermediate land portion 4B divided into a plurality of block land portions in the tire circumferential direction by the first intermediate land portion lug grooves 5B, the edge effect and the drainage characteristics are improved, making it possible to improve the braking performance on snow-covered road surfaces as well as the braking performance on wet road surfaces, respectively. Moreover, with the provision of the circumferential narrow grooves 10 having a groove width that increases and decreases between the first intermediate land portion lug grooves 5B and extending in the tire circumferential direction, it is possible to improve the braking performance on snow-covered road surfaces by the edge effect achieved by the increase and decrease of the groove width as well as improve the braking performance on wet road surfaces by improvements in drainage characteristics.

Note that the wedge portion 9 is preferably provided on both opening edges of the second circumferential groove 3B, thereby making it possible to further improve the braking performance on snow-covered road surfaces by the edge effect. Further, the circumferential narrow grooves 10 equally divide the block land portions between the first intermediate land portion lug grooves 5B in two in the tire lateral direction, thereby making the areas of the land portions on the tread surface 2a equal and making it possible to suppress an extreme decrease in rigidity and thus a decrease in the braking performance on dry road surfaces.

Further, in the pneumatic tire 1 of the present embodiment, preferably the first intermediate land portion lug grooves 5B are disposed at each of the wedge portions 9 of the second circumferential groove 3B, and the circumferential narrow grooves 10 are provided so that the groove width thereof increases and decreases along an incline of the wedge portion 9 between the first intermediate land portion lug grooves 5B.

According to this pneumatic tire 1, the shape on the tread surface 2a of the land portions surrounded by the first intermediate land portion lug groove 5B, the wedge portion 9 of the second circumferential groove 3B, and the circumferential narrow groove 10 is substantially close to a parallelogram, making it possible to make the rigidity of the land portions uniform and thus suppress a decrease in the braking performance on dry road surfaces.

Note that preferably the circumferential narrow grooves 10 are each provided so that the groove width increases or decreases along the incline of the wedge portion 9, thereby uniformly increasing or decreasing the groove width in one direction of the tire circumferential direction, and causing the groove depth to decrease as the groove width is decreased. Thus, a rotation direction of the pneumatic tire 1 is designated so that the side having a decreasing groove width, a shallow groove depth, and a high rigidity is a leading side and the side having an increasing groove width, a deep groove depth, and a low rigidity is a trailing side, thereby strengthening the leading edge, allowing the trailing edge to be softened, and making it possible to improve the braking performance on dry road surfaces. The designation of the rotation direction of the pneumatic tire 1, while not illustrated, is indicated by an indicator (an arrow oriented when the vehicle advances forward) provided on a tire side portion, for example.

Further, in the pneumatic tire 1 of the present embodiment, preferably the wedge portions 9 are each formed by a chamfer provided to the opening edge of the second circumferential groove 3B.

According to this pneumatic tire 1, the wedge portions 9 are each formed by a chamfer, thereby suppressing a volume decrease in the land portions while achieving the edge effect, making it possible to suppress a decrease in rigidity as well as achieve good braking performance on snow-covered road surfaces and dry road surfaces in a compatible manner.

Further, the pneumatic tire 1 of the present embodiment preferably further includes the lateral narrow grooves 8 that divide the block land portions between the first intermediate land portion lug grooves 5B in two in the tire circumferential direction.

According to this pneumatic tire 1, it is possible to improve the braking performance on snow-covered road surfaces by the edge effect of the lateral narrow grooves 8, and improve the braking performance on wet road surfaces by improvements in drainage characteristics.

Note that the lateral narrow grooves 8 equally divide the block land portions between the first intermediate land portion lug grooves 5B in two in the tire circumferential direction, thereby making the areas of the land portions on the tread surface 2a equal and making it possible to suppress an extreme decrease in rigidity and thus a decrease in the braking performance on dry road surfaces.

Further, in the pneumatic tire 1 of the present embodiment, the second circumferential groove 3B provided with the wedge portions 9 is preferably disposed on the side of the first circumferential groove 3A that is near the tire equatorial plane CL.

With the second circumferential groove 3B disposed near the tire equatorial plane CL, an effect of improving the braking performance on snow-covered road surfaces by the edge effect of the wedge portions 9 can be more remarkably achieved. Thus, the second circumferential groove 3B provided with the wedge portions 9 is disposed on the side near the tire equatorial plane CL, making it possible to remarkably achieve an effect of improving the braking performance on snow-covered road surfaces.

Further, the pneumatic tire 1 of the present embodiment preferably further includes the third circumferential groove 3C, the center land portion 4A, the plurality of center land portion first lug grooves 5A, and the plurality of center land portion second lug grooves 5A'. The third circumferential groove 3C is provided adjacent to the tire equatorial plane CL side of the second circumferential groove 3B. The center land portion 4A is formed on the tire equatorial plane CL by the third circumferential groove 3C, between the second circumferential groove 3B and the third circumferential groove 3C, with the second circumferential groove 3B provided with the wedge portions 9 disposed on the side near the tire equatorial plane CL. The plurality of center land portion first lug grooves 5A are provided in the tire circumferential direction with the first end 5Aa in communication with the second circumferential groove 3B provided with the wedge portions 9 and the second end 5Ab terminating inside the center land portion 4A. The plurality of center land portion second lug grooves 5A' are provided in the tire circumferential direction with the first end 5A'a in communication with the third circumferential groove 3C and the second end 5A'b terminating inside the center land portion 4A. The center land portion first lug grooves 5A and the center land portion second lug grooves 5A' are alternately disposed in the tire circumferential direction without communicating.

According to this pneumatic tire 1, the center land portion first lug grooves 5A and the center land portion second lug grooves 5A' provided so as to terminate at the center land portion 4A provided on the tire equatorial plane CL are alternately disposed in the tire circumferential direction without communicating, and thus the center land portion 4A is formed into a rib-like shape. As a result, a decrease in the rigidity of the center land portion 4A, which contributes to improvement in the braking performance on dry road surfaces, is suppressed, making it possible to improve the braking performance on dry road surfaces.

Moreover, the lateral narrow grooves 8 are provided in the center land portion 4A with the first end 8a in communication with the third circumferential groove 3C and the second end 8b terminating inside the center land portion 4A, thereby making it possible to improve the braking performance on snow-covered road surfaces by the edge effect and improve the braking performance on wet road surfaces by improvements in drainage characteristics. Further, the second ends 5Ab, 5A'b, 8b of the center land portion first lug grooves 5A, the center land portion second lug grooves 5A', and the lateral narrow grooves 8 terminate on the tire equatorial plane CL or at a position that does not intersect the tire equatorial plane CL, thereby making it possible to suppress an extreme decrease in rigidity of the center land portion 4A and improve the braking performance on dry road surfaces.

Further, the pneumatic tire 1 of the present embodiment preferably further includes the fourth circumferential groove 3D, the second intermediate land portion 4C, and the plurality of second intermediate land portion main lug grooves (second intermediate land portion lug grooves) 5C. The fourth circumferential groove 3D is provided outwardly adjacent to the third circumferential groove 3C in the tire lateral direction. The second intermediate land portion 4C is formed by the fourth circumferential groove 3D, between the third circumferential groove 3C and the fourth circumferential groove 3D. The plurality of second intermediate land portion main lug grooves 5C are provided in the tire circumferential direction with both ends respectively in communication with the third circumferential groove 3C and the fourth circumferential groove 3D, and divide the second intermediate land portion 4C into a plurality of block land portions in the tire circumferential direction.

According to this pneumatic tire 1, the first intermediate land portion 4B and the second intermediate land portion 4C formed on both sides in the tire lateral direction of the center land portion 4A on the tire equatorial plane CL are each formed so as to be divided into block land portions, thereby making it possible to improve the braking performance on snow-covered road surfaces by the edge effect as well as the braking performance on wet road surfaces by the water drainage effect, suppress an extreme rigidity difference between the land portions sandwiching the center land portion 4A by mutual block land portions, and thus ensure the braking performance on dry road surfaces.

Note that the second intermediate land portion sub lug grooves 5C' are provided in the second intermediate land portion 4C with the first end 5C'a in communication with the fourth circumferential groove 3D and the second end 5C'b terminating inside the second intermediate land portion 4C, thereby making it possible to improve the braking performance on snow-covered road surfaces by the edge effect and the braking performance on wet road surfaces by the water drainage effect. Further, the lateral narrow grooves 8 are provided in the second intermediate land portion 4C with the first end 8a in communication with the terminating end of the second end 5C'b of the second intermediate land portion sub lug groove 5C' and the second end 8b in communication with the third circumferential groove 3C, thereby making it possible to improve the braking performance on snow-covered road surfaces by the edge effect and the braking performance on wet road surfaces by the water drainage effect.

Further, the pneumatic tire 1 of the present embodiment preferably further includes the first shoulder land portion 4D, the plurality of first shoulder land portion main lug grooves 5D, and the first shoulder land portion sub lug grooves 5D'. The first shoulder land portion 4D is formed outward of the fourth circumferential groove 3D in the tire lateral direction. The plurality of first shoulder land portion main lug grooves 5D are each provided in the tire circumferential direction with a first end 5Da passing completely through the first shoulder land portion 4D and opening outward to the tread surface 2a in the tire lateral direction, and the second end 5Db in communication with the fourth circumferential groove 3D. The first shoulder land portion sub lug grooves 5D' are each provided between the first shoulder land portion main lug grooves 5D adjacent in the tire circumferential direction with a first end 5D'a in communication with the fourth circumferential groove 3D and a second end 5D' b terminating inside the first shoulder land portion 4D.

According to this pneumatic tire 1, in the first shoulder land portion 4D, the first shoulder land portion sub lug grooves 5D' are provided between the first shoulder land portion main lug grooves 5D adjacent in the tire circumferential direction in addition to the plurality of first shoulder land portion main lug grooves 5D provided in the tire circumferential direction, making it possible to improve the braking performance on snow-covered road surfaces by the mutual edge effect as well as improve the braking performance on wet road surfaces by the mutual water drainage effect of the lug grooves 5D, 5D'.

Further, in the first shoulder land portion 4D, the shoulder land portion narrow grooves 11 including the first end 11a that passes completely through the first shoulder land portion 4D and opens outward to the tread surface 2a in the tire lateral direction, and the second end 11b that terminates inside the first shoulder land portion 4D, and the lateral narrow grooves 8 that include the first end 8a in communication with the terminating end of the second end 5D'b of the first shoulder land portion sub lug groove 5D' and the second end 8b in communication with the terminating end of the second end 11b of the shoulder land portion narrow groove 11 are further provided, thereby making it possible to supplement the braking performance on snow-covered road surfaces by the edge effect and the braking performance on wet road surfaces by the water drainage effect of the shoulder land portion narrow grooves 11 and the lateral narrow grooves 8.

Further, the pneumatic tire 1 of the present embodiment preferably further includes the second shoulder land portion 4E, a plurality of second shoulder land portion lug grooves 5E, and at least one lateral narrow groove 8. The second shoulder land portion 4E is formed outward of the first circumferential groove 3A in the tire lateral direction with the first circumferential groove 3A of the first circumferential groove 3A and the second circumferential groove 3B disposed outward in the tire lateral direction. The plurality of second shoulder land portion lug grooves 5E are each provided in the tire circumferential direction with a first end 5Ea (see FIGS. 4 and 5) passing completely through the second shoulder land portion 4E and opening outward to the tread surface 2a in the tire lateral direction and a second end 5Eb (see FIGS. 4 and 5) terminating inside the second shoulder land portion 4E. The at least one lateral narrow groove 8 is provided so as to intersect the tire circumferential direction between the second shoulder land portion lug grooves 5E adjacent in the tire circumferential direction.

According to this pneumatic tire 1, in the second shoulder land portion 4E, the lateral narrow groove 8 is provided between the second shoulder land portion lug grooves 5E adjacent in the tire circumferential direction in addition to the plurality of second shoulder land portion lug grooves 5E provided in the tire circumferential direction, making it possible to improve the braking performance on snow-covered road surfaces by the mutual edge effect and improve the braking performance on wet road surfaces by the mutual water drainage effect of the second shoulder land portion lug grooves 5E and the lateral narrow groove 8.

Further, in the pneumatic tire 1 of the present embodiment, the lateral narrow groove 8 has a groove width not less than 0.4 mm and not greater than 1.5 mm.

When the groove width of the lateral narrow groove 8 is less than 0.4 mm, the drainage performance tends to decrease, and when the groove width exceeds 1.5 mm, the rigidity of the land portions tends to decrease. Thus, the groove width of the lateral narrow groove 8 is preferably not less than 0.4 mm and not greater than 1.5 mm.

In the embodiment described above, the center land portion first lug grooves 5A of the center land portion 4A, and the first intermediate land portion lug grooves 5B of the first intermediate land portion 4B are each provided so that the first end 5Aa and the second end 5Bb face each other at the second circumferential groove 3B, and thus integrally pass completely through the second circumferential groove 3B. Thus, the grooves pass completely through the second circumferential groove 3B in the tire lateral direction, thereby improving drainage characteristics, making it possible to contribute to improvements in braking performance on wet road surfaces.

Further, in the embodiment described above, the center land portion second lug grooves 5A' of the center land portion 4A, and the second intermediate land portion main lug grooves 5C of the second intermediate land portion 4C are each provided so that the first end 5Ca and the first end 5A'a face each other at the third circumferential groove 3C, and thus integrally pass completely through the third circumferential groove 3C. That is, the second intermediate land portion main lug groove 5C and the first shoulder land portion sub lug grooves 5D' of the first shoulder land portion 4D are provided so as to integrally pass completely through the fourth circumferential groove 3D with the second end 5Cb and the first end 5D'a facing each other at the fourth circumferential groove 3D. Furthermore, the first shoulder land portion sub lug groove 5D', the shoulder land portion narrow groove 11, and the lateral narrow groove 8 of the first shoulder land portion 4D are provided so as to integrally communicate. Thus, the grooves pass completely through the third circumferential groove 3C and the fourth circumferential groove 3D in the tire lateral direction, thereby improving drainage characteristics and making it possible to contribute to improvements in braking performance on wet road surfaces. Note that while the second end 5D'b of the first shoulder land portion sub lug groove 5D' communicates with the lateral narrow groove 8 in the first shoulder land portion 4D, the lateral narrow groove 8 has a narrower groove width than that of the first shoulder land portion sub lug groove 5D' and therefore the first shoulder land portion sub lug groove 5D' substantially terminates inside the first shoulder land portion 4D. The terminating end of this first shoulder land portion sub lug groove 5D' is inward of the ground contact edge T in the tire lateral direction, thereby suppressing emission of air column resonance, and thus has an effect of decreasing noise outside the vehicle.

Further, in the embodiment described above, the lateral narrow grooves 8 of the center land portion 4A and the lateral narrow grooves 8 of the second intermediate land portion 4C are provided so as to integrally pass completely through the third circumferential groove 3C with the first ends 8a and the second ends 8b facing each other at the third circumferential groove 3C. Then, the lateral narrow grooves 8 of the second intermediate land portion 4C are each formed so that the first end 8a communicates with the second end 5C'b of the second intermediate land portion sub lug groove 5C'. Furthermore, the second intermediate land portion sub lug grooves 5C' and the first shoulder land portion main lug grooves 5D of the first shoulder land portion 4D are each provided so as to integrally pass completely through the fourth circumferential groove 3D with the first end 5C'a and the second end 5Db facing each other at the fourth circumferential groove 3D. Thus, the grooves pass completely through the third circumferential groove 3C and the fourth circumferential groove 3D in the tire lateral direction, thereby improving drainage characteristics and making it possible to contribute to improvements in braking performance on wet road surfaces.

Below, the preferred form of the tread portion 2 of the pneumatic tire 1 of the present embodiment will be described.

Figure 4:
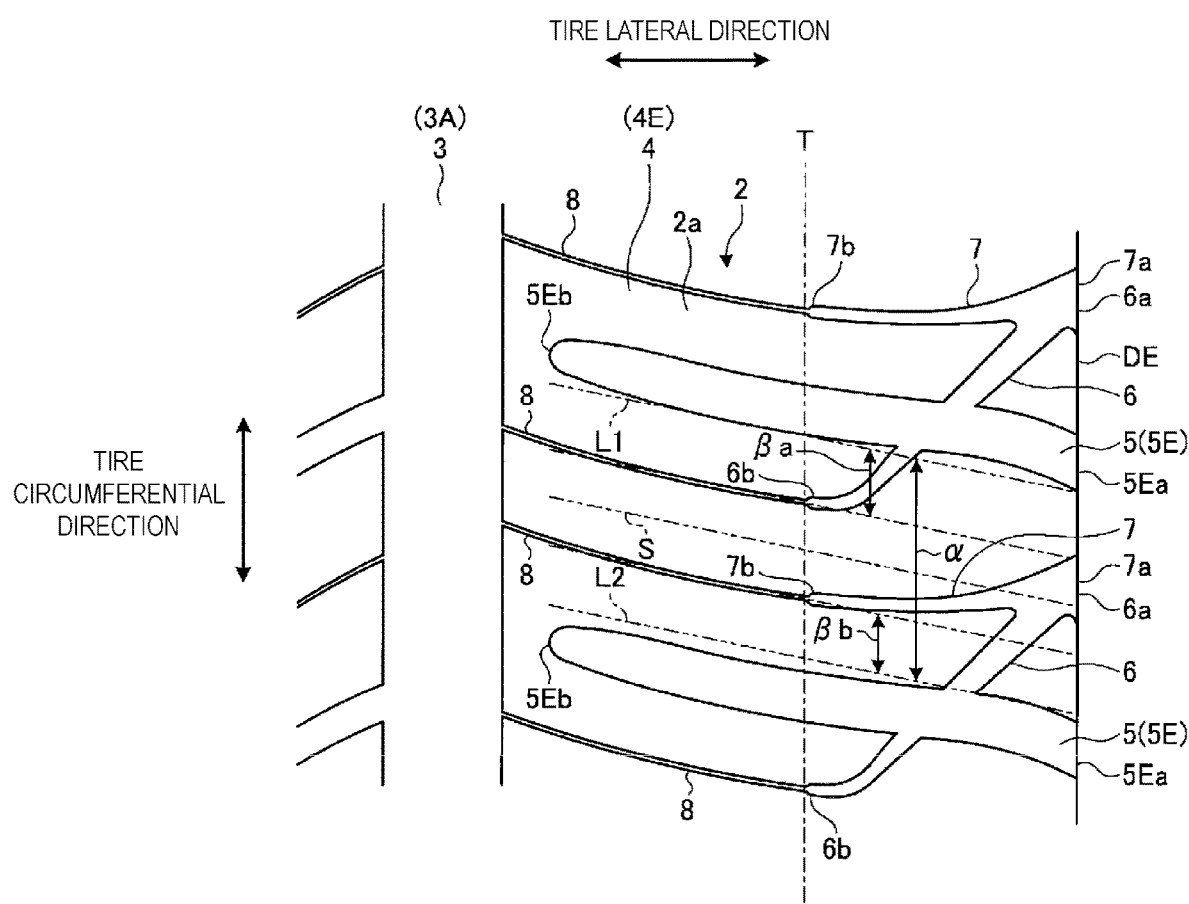
FIG. 4 is a partial enlarged plan view of the tread portion of the pneumatic tire according to the embodiment of the present technology.
Figure 5:
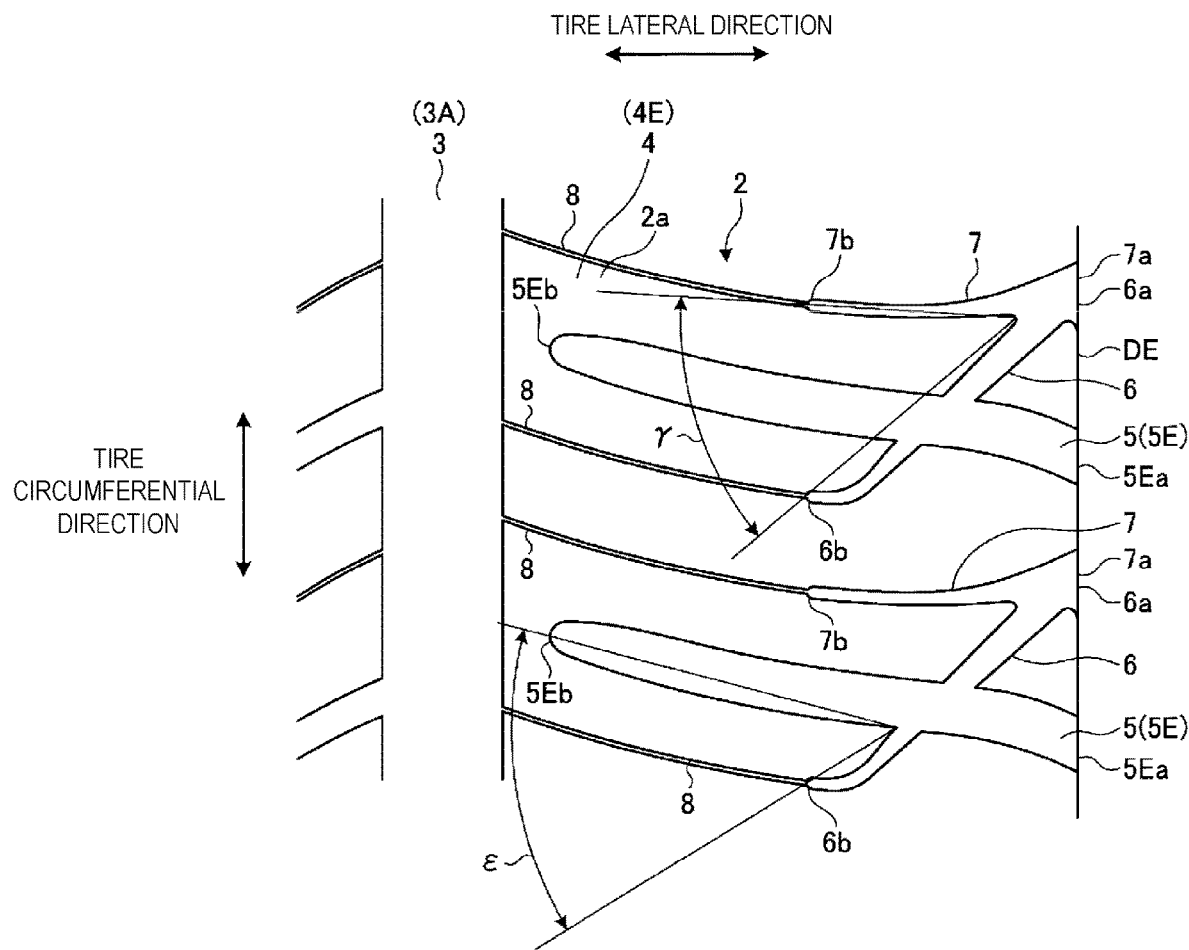
FIG. 5 is a partial enlarged plan view of the tread portion of the pneumatic tire according to the embodiment of the present technology.
Figure 6:
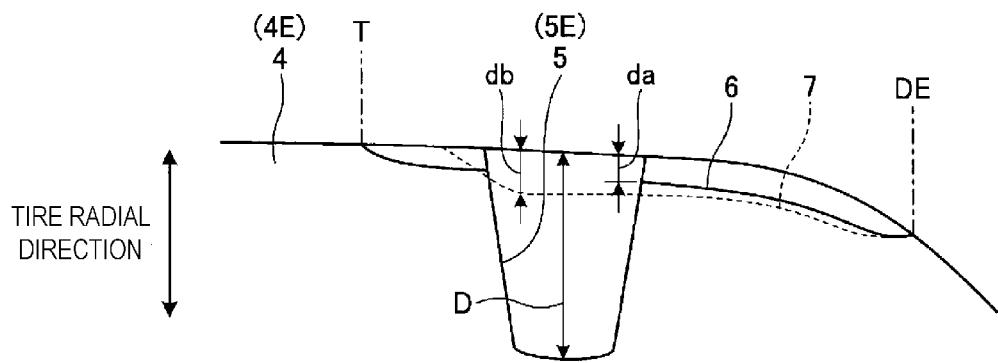
FIG. 6 is a partial enlarged cross-sectional view of the tread portion of the pneumatic tire according to the embodiment of the present technology.
Figure 7:
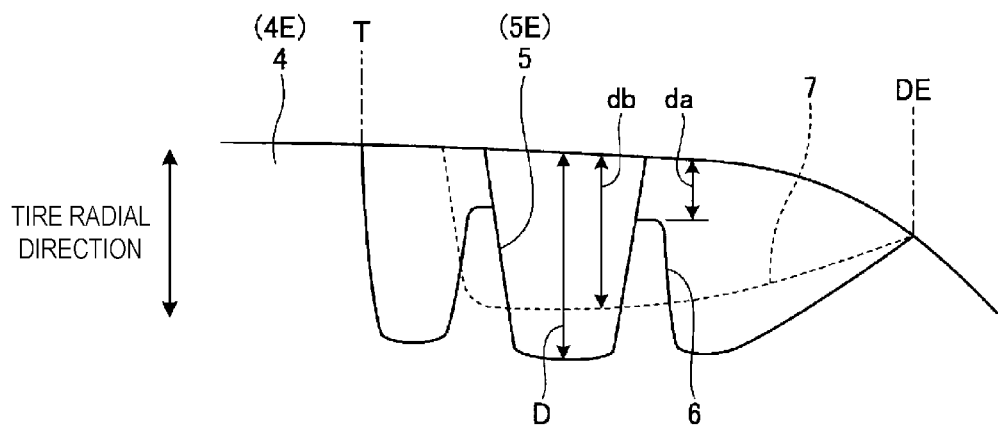
FIG. 7 is a partial enlarged cross-sectional view of the tread portion of the pneumatic tire according to the embodiment of the present technology.

FIGS. 4 and 5 are partial enlarged plan views of the tread portion of the pneumatic tire according to the present embodiment. FIGS. 6 and 7 are partial enlarged cross-sectional views of the tread portion of the pneumatic tire according to the present embodiment. FIGS. 4 to 7 are enlarged views of the second shoulder land portion 4E.

As illustrated in FIGS. 2 and 4, in the pneumatic tire 1 of the present embodiment, the lug groove 5, an intersecting narrow groove 6, a branching narrow groove 7, and the lateral narrow groove 8 are formed in the second shoulder land portion 4E.

The lug grooves 5 of the second shoulder land portion 4E are referred to as the second shoulder land portion lug grooves 5E in the present embodiment. The second shoulder land portion lug grooves 5E are provided intersecting the tire circumferential direction so as to intersect the ground contact edge T. The second shoulder land portion lug grooves 5E are formed so that the first end 5Ea is outward in the tire lateral direction and extends and opens to the design end DE, and the second end 5Eb terminates inside the second shoulder land portion 4E without communicating with the first circumferential groove 3A. The second shoulder land portion lug grooves 5E are provided so as to be separated from each other in the tire circumferential direction. Further, the second shoulder land portion lug grooves 5E are provided so as to extend substantially in parallel with and not intersect each other. Note that, while not illustrated, the second end 5Eb of the second shoulder land portion lug groove 5E may communicate with the first circumferential groove 3A.

The intersecting narrow grooves 6 are each provided so as to intersect the second shoulder land portion lug groove 5E at a position outward of the ground contact edge T in the tire lateral direction. The intersecting narrow grooves 6 each include a first end 6a that is outward in the tire lateral direction and extends and opens to the design end DE, and a second end 6b that terminates inside the second shoulder land portion 4E without communicating with the first circumferential groove 3A. While, in the present embodiment, preferably the second ends 6b of the intersecting narrow grooves 6 each terminate outward of the ground contact edge T in the tire lateral direction and all intersecting narrow grooves 6 are provided outward of the ground contact edge T in the tire lateral direction, the second ends 6b may each be provided so as to terminate inward of the ground contact edge T in the tire lateral direction.

The branching narrow grooves 7 branch from each of the intersecting narrow grooves 6, and are disposed between the second shoulder land portion lug grooves 5E. The branching narrow grooves 7 each include a first end 7a that is outward in the tire lateral direction and branches from the first end 6a of the intersecting narrow groove 6 so as to extend and open to the design end DE, and a second end 7b that terminates inside the second shoulder land portion 4E without communicating with the first circumferential groove 3A. While, in the present embodiment, preferably the second end 7b of the branching narrow grooves 7 each terminates outward of the ground contact edge T in the tire lateral direction and all branching narrow grooves 7 are provided outward of the ground contact edge T in the tire lateral direction, the second end 7b may each be provided so as to terminate inward of the ground contact edge T in the tire lateral direction.

The lateral narrow grooves 8 are each provided from the first circumferential groove 3A to the second end 6b of the intersecting narrow groove 6 that terminates inside the second shoulder land portion 4E. Further, the lateral narrow grooves 8 are each provided from the first circumferential groove 3A to the second end 7b of the branching narrow groove 7 that terminates inside the second shoulder land portion 4E. That is, the end portions (second ends 6b, 7b) of the intersecting narrow grooves 6 and the branching narrow grooves 7 inward in the tire lateral direction each communicate with the first circumferential groove 3A via the lateral narrow groove 8.

Here, in the present embodiment, the lug grooves 5 have, for example, a groove width not less than 1.5 mm and not greater than those of the circumferential grooves 3, and a groove depth not greater than those of the circumferential grooves 3. The intersecting narrow grooves 6 and the branching narrow grooves 7 each have a groove width not less than 0.4 mm and not greater than 1.5 mm, and a groove depth not greater than those of the circumferential grooves 3, for example. Further, the lateral narrow grooves 8 each have a groove width not less than 0.4 mm and not greater than 1.5 mm and not greater than those of the intersecting narrow grooves 6 and the branching narrow grooves 7, and a groove depth not greater than those of the circumferential grooves 3 and the lug grooves 5, for example. Note that, when the groove depth changes in the lug groove 5, the intersecting narrow groove 6, the branching narrow groove 7, and the lateral narrow groove 8, the deepest groove depth is set within the range described above.

The lateral narrow grooves 8, the intersecting narrow grooves 6, and the branching narrow grooves 7 communicate with each other, and thus the groove width and the groove depth of the communicating portion is defined by the change in groove width. Further, while the lateral narrow grooves 8, the intersecting narrow grooves 6, and the branching narrow grooves 7 may have the same groove depth in the communicating portion, the groove depths of intersecting narrow grooves 6 and the branching narrow grooves 7 may be formed so as to be greater than that of the lateral narrow grooves 8.

Thus, the pneumatic tire 1 of the present embodiment further includes the second shoulder land portion 4E (land portion 4), the ground contact edge T, the plurality of second shoulder land portion lug grooves 5E (lug grooves 5), and the intersecting narrow grooves 6. The second shoulder land portion 4E is formed on the tread surface 2a of the tread portion 2, on the outermost side in the tire lateral direction by the circumferential groove 3 (first circumferential groove 3A) extending in the tire circumferential direction. The ground contact edge T exists on the second shoulder land portion 4E. The plurality of second shoulder land portion lug grooves 5E are provided in the tire circumferential direction and intersect the ground contact edge T. The intersecting narrow grooves 6 are each provided so as to intersect the second shoulder land portion lug groove 5E outward of the ground contact edge T in the tire lateral direction.

According to this pneumatic tire 1, the intersecting narrow grooves 6 that intersect the second shoulder land portion lug grooves 5E outward of the ground contact edge T in the tire lateral direction are provided and thus, when traveling on snow-covered road surfaces, an intersection portion of the second shoulder land portion lug groove 5E and the intersecting narrow groove 6 exists in a ground contact region that is substantially spread outward in the tire lateral direction when entering snow, thereby improving traction characteristics and making it possible to improve braking performance on snow-covered road surfaces. Moreover, the intersection portion of the second shoulder land portion lug groove 5E and the intersecting narrow groove 6 does not exist outside the ground contact region on dry road surfaces, and thus does not impact travel on dry road surfaces or wet road surfaces. Moreover, the groove depth of the intersecting narrow groove 6 is shallow at least in the section intersecting the second shoulder land portion lug groove 5E, making it possible to suppress a decrease in rigidity in the second shoulder land portion 4E and improve the braking performance on dry road surfaces.

Further, the pneumatic tire 1 of the present embodiment further includes the branching narrow grooves 7 in the second shoulder land portion 4E. The branching narrow grooves 7 each branch from the intersecting narrow groove 6 outward of the ground contact edge T in the tire lateral direction, extend inward in the tire lateral direction, and are disposed between the second shoulder land portion lug grooves 5E.

According to this pneumatic tire 1, when traveling on snow-covered road surfaces, a branching portion of the intersecting narrow groove 6 and the branching narrow groove 7 exists in a ground contact region that is substantially spread outward in the tire lateral direction when entering snow, thereby improving traction characteristics and making it possible to further improve braking performance on snow-covered road surfaces. Moreover, the branching portion of the intersecting narrow groove 6 and the branching narrow groove 7 does not exist outside the ground contact region on dry road surfaces, and thus does not impact travel on dry road surfaces or wet road surfaces.

Additionally, in the pneumatic tire 1 of the present embodiment, the intersecting narrow grooves 6 and the branching narrow grooves 7 are preferably formed so that the end portions 6b, 7b inward in the tire lateral direction terminate at the second shoulder land portion 4E.

According to this pneumatic tire 1, the intersecting narrow grooves 6 and the branching narrow grooves 7 are each provided so as to terminate at the second shoulder land portion 4E, making it possible to suppress a decrease in rigidity in the second shoulder land portion 4E and suppress the impact on the braking performance on dry road surfaces.

Further, in the pneumatic tire 1 of the present embodiment, as illustrated in FIG. 4, the intersecting narrow groove 6 is preferably formed so that the end portion (second end 6b) inward in the tire lateral direction is disposed closer to the second shoulder land portion lug groove 5E intersected by the intersecting narrow groove 6 than a middle S of the second shoulder land portion lug grooves 5E adjacent in the tire circumferential direction. Furthermore, the branching narrow groove 7 is preferably formed so that the end portion (second end 7b) inward in the tire lateral direction is disposed closer to the second shoulder land portion lug groove 5E intersected by the intersecting narrow groove 6 from which the branching narrow groove 7 branches than the middle S of the second shoulder land portion lug grooves 5E adjacent in the tire circumferential direction.

The middle S of the second shoulder land portion lug grooves 5E adjacent in the tire circumferential direction is the center between the second shoulder land portion lug grooves 5E adjacent in the tire circumferential direction, and is indicated by the center line parallel with auxiliary lines L that pass through the groove edges closest to the second shoulder land portion lug grooves 5E.

According to this pneumatic tire 1, the second ends 6b, 7b of the intersecting narrow groove 6 and the branching narrow groove 7 are each disposed closer to the adjacent second shoulder land portion lug grooves 5E than the middle S of the second shoulder land portion lug grooves 5E, making it possible to suppress a decrease in rigidity in the second shoulder land portion 4E between the adjacent second shoulder land portion lug grooves 5E and suppress the impact on the braking performance on dry road surfaces, even if the intersecting narrow grooves 6 and the branching narrow grooves 7 are provided.

Further, in the pneumatic tire 1 of the present embodiment, given a distance α in the tire circumferential direction between the second shoulder land portion lug grooves 5E adjacent in the tire circumferential direction (a distance between auxiliary lines L1, L2), a distance Pa in the tire circumferential direction between the end portion (second end 6b) inward of the intersecting narrow groove 6 in the tire lateral direction and the auxiliary line L1 of the second shoulder land portion lug groove 5E intersected by the intersecting narrow groove 6, and a distance βb in the tire circumferential direction between the end portion (second end 7b) inward of the branching narrow groove 7 in the tire lateral direction and the auxiliary line L2 of the second shoulder land portion lug groove 5E intersected by the intersecting narrow groove 6 from which the branching narrow groove 7 branches, the relationships $0.1\alpha < \beta a < 0.5\alpha$ and $0.1\alpha < \beta b < 0.5\alpha$ are preferably satisfied.

Note that the auxiliary line L1 is a tangent line that comes into contact with an innermost side of the opening edge of the second shoulder land portion lug groove 5E on the end portion (second end 6b) side inward of the intersecting narrow groove 6 in the tire lateral direction. Further, the auxiliary line L2 is a tangent line that comes into contact with the innermost side of the opening edge of the second shoulder land portion lug groove 5E intersected by the intersecting narrow groove 6 from which the branching narrow groove 7 branches on the end portion (second end 7b) side inward of the branching narrow groove 7 in the tire lateral direction. The auxiliary lines L1, L2 are parallel with each other. Further, the middle S described above is indicated by a straight line in the center of the auxiliary lines L1, L2.

According to this pneumatic tire 1, the area between the adjacent second shoulder land portion lug grooves 5E is divided in three by the intersecting narrow groove 6 and the branching narrow groove 7, making it possible to suppress a decrease in rigidity in the second shoulder land portion 4E between the second shoulder land portion lug grooves 5E and suppress the impact on the braking performance on dry road surfaces, even if the intersecting narrow grooves 6 and the branching narrow grooves 7 are provided.

Further, in the pneumatic tire 1 of the present embodiment, as illustrated in FIG. 5, preferably an angle γ formed by the intersecting narrow groove 6 and the branching narrow groove 7 branching from the intersecting narrow groove 6 satisfies a range of γ<80°.

The angle γ, as illustrated in FIG. 5, is an angle formed by a line drawn so as to connect a branch point of the branching narrow groove 7 from the intersecting narrow groove 6 and the tip 6b of the intersecting narrow groove 6, and a line drawn so as to connect a branch point of the branching narrow groove 7 from the intersecting narrow groove 6 and the end 7b of the branching narrow groove 7, in a plan view of the tread portion 2.

According to this pneumatic tire 1, the angle γ is set to less than 80°, and thus the intersecting narrow grooves 6 and the branching narrow grooves 7 are thick grooves that connect at the design end DE of the tread portion 2. The connected portion thus provides a wide groove outside the contact patch during tire travel, thereby alleviating heat build-up that occurs in the tire interior, alleviating tire rolling resistance, and allowing comfortable tire travel, making it possible to improve the braking performance on dry road surfaces as well as the braking performance on snow-covered road surfaces. Further, when the angle γ is 80° or greater, the opening angle of the branched section is too large, bringing the narrow grooves closer in the tire circumferential direction, resulting in low contribution to traction characteristics on snow-covered road surfaces and a low effect of improving braking performance. However, setting the angle γ to less than 80° makes it possible to remarkably achieve an effect of improving braking performance. Note that, to more remarkably achieve an effect of improving braking performance, the angle γ is more preferably set within a range of not less than 40° and not greater than 60°.

Further, in the pneumatic tire 1 of the present embodiment, as illustrated in FIG. 5, preferably an angle ε formed inward in the tire lateral direction by the intersecting narrow groove 6 and the second shoulder land portion lug groove 5E intersected by the intersecting narrow groove 6 satisfies a range of 10°<ε<90°.

The angle ε, as illustrated in FIG. 5, is an angle formed by a line drawn so as to connect the intersection point where the intersecting narrow groove 6 intersects the second shoulder land portion lug groove 5E and the tip 5Eb of the second shoulder land portion lug groove 5E, and a line drawn so as to connect the intersection point where the intersecting narrow groove 6 intersects the second shoulder land portion lug groove 5E and the tip 6b of the intersecting narrow groove 6, in a plan view of the tread portion 2.

When the angle ε is 10° or less, an acute angle portion occurs at the intersection portion where the intersecting narrow groove 6 intersects the second shoulder land portion lug groove 5E, possibly causing damage such as tearing of the intersection portion. On the other hand, when the angle ε is 90° or greater, the intersecting narrow groove 6 is closer to the tire circumferential direction, resulting in a lower contribution to traction characteristics on snow-covered road surfaces and a lower effect of improving braking performance. Thus, the angle ε is preferably set within the range of 10°<ε<90°. Note that, to more remarkably achieve an effect of improving braking performance on dry road surfaces and braking performance on snow-covered road surfaces, the angle ε is more preferably set within a range of 40°<ε<60°.

Additionally, with the pneumatic tire 1 of the present embodiment, the intersecting narrow grooves 6 and the branching narrow grooves 7 are each preferably formed so that the groove width progressively decreases inward in the tire lateral direction.

According to this pneumatic tire 1, the groove widths of the intersecting narrow grooves 6 and the branching narrow grooves 7 are formed so as to progressively decrease inward in the tire lateral direction, thereby suppressing the narrowing of the space between the intersecting narrow groove 6 and the branching narrow groove 7 as well as the space between the intersecting narrow groove 6, the branching narrow groove 7, and the second shoulder land portion lug grooves 5E. This makes it possible to suppress a decrease in rigidity in the second shoulder land portion 4E between the adjacent second shoulder land portion lug grooves 5E and suppress the impact on the braking performance on dry road surfaces, even if the intersecting narrow grooves 6 and the branching narrow grooves 7 are provided.

Additionally, in the pneumatic tire 1 of the present embodiment, preferably at least one of the intersecting narrow groove 6 and the branching narrow groove 7 is formed so that the end portion (second ends 6b, 7b) inward in the tire lateral direction communicates with the first circumferential groove 3A via the lateral narrow groove 8.

According to this pneumatic tire 1, the lateral narrow grooves 8 are provided, thereby improving a flexibility of the second shoulder land portion 4E inward in the tire lateral direction of the end portions (second end 6b, 7b) of the intersecting narrow groove 6 and the branching narrow groove 7 inward in the tire lateral direction, making it possible to improve the braking performance on snow-covered road surfaces. Moreover, according to this pneumatic tire 1, the lateral narrow grooves 8 are provided, thereby making it possible to improve the braking performance on snow-covered road surfaces by the edge effect and improve the braking performance on wet road surfaces by improvements in drainage characteristics.

Further, in the pneumatic tire 1 of the present embodiment, as illustrated in FIGS. 6 and 7, the intersecting narrow groove 6 and the second shoulder land portion lug groove 5E intersected by the intersecting narrow groove 6 are preferably formed so that a groove depth da of the intersecting narrow groove 6 at least at the intersecting portion and a groove depth D of the second shoulder land portion lug groove 5E satisfy a range of da≤0.5 D. Furthermore, in the pneumatic tire 1 of the present embodiment, as illustrated in FIGS. 6 and 7, the branching narrow groove 7 and the second shoulder land portion lug groove 5E adjacent to the branching narrow groove 7 in the tire circumferential direction are preferably formed so that a groove depth db of the branching narrow groove 7 and a groove depth D of the second shoulder land portion lug groove 5E satisfy a range of db≤0.5 D.

FIGS. 6 and 7 are cross-sectional views of the intersecting narrow groove 6 taken in the extension direction, and illustrate the intersecting narrow groove 6 and the branching narrow groove 7 in different modes. The intersecting narrow groove 6 and the branching narrow groove 7 illustrated in FIG. 6 extend at substantially the same groove depth. Further, the intersecting narrow groove 6 illustrated in FIG. 7 is formed so that the groove bottom at the intersection portion with the second shoulder land portion lug groove 5E is raised, decreasing the groove depth. Then, the groove depth D of the second shoulder land portion lug groove 5E is the deepest groove depth in the intersection portion with the intersecting narrow groove 6. Further, the groove depth da of the intersecting narrow groove 6 is the groove depth on the deepest side at the opening to the second shoulder land portion lug groove 5E in the intersection portion with the second shoulder land portion lug groove 5E. Further, the groove depth db of the branching narrow groove 7 is the deepest groove depth in the branching narrow groove 7, excluding the branching portion from the intersecting narrow groove 6.

When the groove depths da, db of the intersecting narrow groove 6 and the branching narrow groove 7 exceed the ranges of da≤0.5 D and db≤0.5 D, the groove depths are too deep, causing a decrease in rigidity in the second shoulder land portion 4E between the second shoulder land portion lug grooves 5E due to the provision of the intersecting narrow groove 6 and the branching narrow groove 7. As a result, the braking performance on dry road surfaces may tend to decrease and damage such as tearing may occur. Thus, preferably the groove depths da, db of the intersecting narrow groove 6 and the branching narrow groove 7 are set within the ranges of da≤0.5 D and db≤0.5 D. Note that, within the ranges described above, numerically the groove depths da, db of the intersecting narrow groove 6 and the branching narrow groove 7 are each preferably 2 mm or less.

Note that the modes of each of the grooves 5, 6, 7, and 8 of the second shoulder land portion 4E described above make it possible to achieve the effects described above when applied to only one shoulder land portion as illustrated in FIG. 2 and when applied to both shoulder land portions (not illustrated).

Examples

In these examples, performance tests for braking performance on dry road surfaces, braking performance on wet road surfaces, and braking performance on snow-covered road surfaces were performed on a plurality of types of pneumatic tires under different conditions (see FIGS. 8A-8C).

In these performance tests, pneumatic tires having a tire size of 205/55R16 were assembled on 16×6.5 JJ rims, inflated to the regular internal pressure (200 kPa), and mounted on a test vehicle (1600 cc, front engine front wheel drive vehicle).

The braking performance on dry road surfaces was evaluated by measuring braking distance of the test vehicle described above from a speed of 100 km/h on a dry road surface test course. Then, the measurement results were expressed as index values with the result of the conventional example being defined as the reference (100). In this evaluation, larger values are preferable.

The method of evaluation of the braking performance on wet road surfaces was to measure the braking distance of the test vehicle from a speed of 100 km/h on a wet road surface test course with a water depth of 1 mm. Then, the measurement results were expressed as index values with the result of the conventional example being defined as the reference (100). In this evaluation, larger values are preferable.

The breaking performance on snow-covered road surfaces was evaluated by measuring braking distance with ABS brakes of the test vehicle described above from a speed of 40 km/h on a snow-compacted road surface. Then, the measurement results were expressed as index values with the result of the conventional example being defined as the reference (100). In this evaluation, larger values are preferable.

In FIGS. 8A-8C, the pneumatic tires that were used as the test tires included five land portions formed by four circumferential grooves on the tread surface. The land portions included the center land portion disposed on the tire equatorial plane, the first intermediate land portions and the second intermediate land portions disposed adjacent to the center land portion on the two sides in the tire lateral direction, and the first shoulder land portions and the second shoulder land portions disposed adjacent to the middle land portions outward in the tire lateral direction.

The pneumatic tire of the conventional example illustrated in FIG. 8A was not provided with the wedge portions in the two circumferential grooves (the first circumferential groove and the second circumferential groove) that formed the first intermediate land portion. Further, in the pneumatic tire of the conventional example, the intermediate land portion had a rib-like shape, and did not include circumferential narrow grooves. The pneumatic tire of the comparative example was not provided with the wedge portions in the two circumferential grooves (the first circumferential groove and the second circumferential groove) that formed the first intermediate land portion. Further, in the pneumatic tire of the comparative example, the intermediate land portion had a rib-like shape, and included circumferential narrow grooves having a uniform groove width.

On the other hand, the pneumatic tires of Examples 1 to 13 were each provided with the wedge portions in one of the two circumferential grooves (the first circumferential groove and the second circumferential groove) that formed the first intermediate land portion. Further, the pneumatic tires of Examples 1 to 13 were each divided into block land portions by lug grooves (first intermediate land portion lug grooves), and provided with circumferential narrow grooves that had a groove width that increased and decreased between adjacent lug grooves and extended in the tire circumferential direction. Further, the pneumatic tires of Examples 5 to 13 were formed so that one circumferential groove (second circumferential groove) provided with wedge portions was disposed on the tire equatorial plane side of the other circumferential groove (first circumferential groove). Further, the pneumatic tires of Examples 6 to 13 were formed so that a center land portion was formed into a rib-like shape by terminating center land portion first lug grooves and terminating center land portion second lug grooves. Further, the pneumatic tires of Examples 7 to 13 were formed so that the second intermediate land portion was divided into block land portions by second intermediate land portion main lug grooves (second intermediate land portion lug grooves). Further, the pneumatic tires of Examples 8 to 13 were formed so that the first shoulder land portion was divided into block land portions by the first shoulder land portion main lug grooves, and the first shoulder land portion sub lug grooves terminated between the first shoulder land portion main lug grooves. Further, in the pneumatic tires of Examples 9 to 13, a rib-like shape was formed by the terminating second shoulder land portion lug grooves. In the pneumatic tires of Examples 10 to 13, two lateral narrow grooves were formed between the second shoulder land portion lug grooves. Further, in the pneumatic tires of Example 11 to 13, the groove width of the lateral narrow groove was specified.

As shown in the test results of FIGS. 8A-8C, with the pneumatic tires according to the Examples 1 to 13, it can be seen that the braking performance on snow-covered road surfaces, wet road surfaces, and dry road surfaces were each enhanced.

The invention claimed is:

1. A pneumatic tire, comprising:
a first circumferential groove and a second circumferential groove provided in a tread surface of a tread portion and extending in a tire circumferential direction;
a first intermediate land portion formed between the first circumferential groove and the second circumferential groove;
a plurality of wedge portions provided successively in the tire circumferential direction at the second circumferential groove and inclined in the tire circumferential direction at least at an opening edge on the first intermediate land portion side of the second circumferential groove;
a plurality of first intermediate land portion lug grooves provided in the tire circumferential direction with both ends respectively in communication with the first circumferential groove and the second circumferential groove,
the plurality of first intermediate land portion lug grooves dividing the first intermediate land portion into a plurality of block land portions in the tire circumferential direction; and
a circumferential narrow groove configured with both ends respectively in communication with first intermediate land portion lug grooves of the plurality of first intermediate land portion lug grooves that are adjacent in the tire circumferential direction,
the circumferential narrow groove
dividing each of the plurality of block land portions between the first intermediate land portion lug grooves in two in a tire lateral direction,
having a groove width that increases and decreases between the first intermediate land portion lug grooves that are adjacent, and
extending in the tire circumferential direction;
the plurality of first intermediate land portion lug grooves being each disposed at each of the plurality of wedge portions of the second circumferential groove, and each having a groove width that increases and decreases along an incline of each of the plurality of wedge portions between the first intermediate land portion lug grooves.

2. The pneumatic tire according to claim 1, wherein the plurality of wedge portions are formed by a chamfer provided to the opening edge of the second circumferential groove.

3. The pneumatic tire according to claim 1, further comprising a lateral narrow groove dividing each of the plurality of block land portions between the first intermediate land portion lug grooves in two in the tire circumferential direction.

4. The pneumatic tire according to claim 1, wherein the second circumferential groove is disposed on a side of the first circumferential groove that is near a tire equatorial plane.

5. The pneumatic tire according claim 1, further comprising:
a third circumferential groove provided adjacent to the tire equatorial plane side of the second circumferential groove;
a center land portion on the tire equatorial plane formed by the third circumferential groove, between the second circumferential groove and the third circumferential groove, with the second circumferential groove disposed on a side near the tire equatorial plane;
a plurality of center land portion first lug grooves provided in the tire circumferential direction with a first end in communication with the second circumferential groove and a second end terminating inside the center land portion; and
a plurality of center land portion second lug grooves provided in the tire circumferential direction with a first end in communication with the third circumferential groove and a second end terminating inside the center land portion;
the plurality of center land portion first lug grooves and the plurality of center land portion second lug grooves being alternately disposed in the tire circumferential direction without communicating.

6. The pneumatic tire according to claim 5, further comprising:
a fourth circumferential groove provided outwardly adjacent to the third circumferential groove in the tire lateral direction;
a second intermediate land portion formed by the fourth circumferential groove, between the third circumferential groove and the fourth circumferential groove; and
a plurality of second intermediate land portion lug grooves provided in the tire circumferential direction with both ends respectively in communication with the third circumferential groove and the fourth circumferential groove, the plurality of second intermediate land portion lug grooves dividing the second intermediate land portion into a plurality of block land portions in the tire circumferential direction.

7. The pneumatic tire according to claim 6, further comprising:
a first shoulder land portion formed outward of the fourth circumferential groove in the tire lateral direction;
a plurality of first shoulder land portion main lug grooves each provided in the tire circumferential direction with a first end passing completely through the first shoulder land portion and opening outward to the tread surface in the tire lateral direction and a second end in communication with the fourth circumferential groove; and
a first shoulder land portion sub lug groove provided between adjacent first shoulder land portion main lug grooves of the plurality of first shoulder land portion main lug grooves in the tire circumferential direction with a first end in communication with the fourth circumferential groove and a second end terminating inside the first shoulder land portion.

8. The pneumatic tire according to claim 1, further comprising:
a second shoulder land portion formed outward of the first circumferential groove in the tire lateral direction with the first circumferential groove of the first circumferential groove and the second circumferential groove disposed outward in the tire lateral direction;
a plurality of second shoulder land portion lug grooves each provided in the tire circumferential direction with a first end passing completely through the second shoulder land portion and opening outward to the tread surface in the tire lateral direction and a second end terminating inside the second shoulder land portion; and
at least one lateral narrow groove intersecting the tire circumferential direction between adjacent second shoulder land portion lug grooves of the plurality of second shoulder land portion lug grooves in the tire circumferential direction.

9. The pneumatic tire according to claim 8, wherein the lateral narrow groove has a groove width not less than 0.4 mm and not greater than 1.5 mm.

10. The pneumatic tire according to claim 2, further comprising a lateral narrow groove dividing each of the plurality of block land portions between the first intermediate land portion lug grooves in two in the tire circumferential direction.

11. The pneumatic tire according to claim 10, wherein the second circumferential groove is disposed on a side of the first circumferential groove that is near a tire equatorial plane.

12. The pneumatic tire according claim 11, further comprising:
 a third circumferential groove provided adjacent to the tire equatorial plane side of the second circumferential groove;
 a center land portion on the tire equatorial plane formed by the third circumferential groove, between the second circumferential groove and the third circumferential groove, with the second circumferential groove disposed on a side near the tire equatorial plane;
 a plurality of center land portion first lug grooves provided in the tire circumferential direction with a first end in communication with the second circumferential groove and a second end terminating inside the center land portion; and
 a plurality of center land portion second lug grooves provided in the tire circumferential direction with a first end in communication with the third circumferential groove and a second end terminating inside the center land portion;
 the plurality of center land portion first lug grooves and the plurality of center land portion second lug grooves being alternately disposed in the tire circumferential direction without communicating.

13. The pneumatic tire according to claim 12, further comprising:
 a fourth circumferential groove provided outwardly adjacent to the third circumferential groove in the tire lateral direction;
 a second intermediate land portion formed by the fourth circumferential groove, between the third circumferential groove and the fourth circumferential groove; and
 a plurality of second intermediate land portion lug grooves provided in the tire circumferential direction with both ends respectively in communication with the third circumferential groove and the fourth circumferential groove, the plurality of second intermediate land portion lug grooves dividing the second intermediate land portion into a plurality of block land portions in the tire circumferential direction.

14. The pneumatic tire according to claim 13, further comprising:
 a first shoulder land portion formed outward of the fourth circumferential groove in the tire lateral direction;
 a plurality of first shoulder land portion main lug grooves each provided in the tire circumferential direction with a first end passing completely through the first shoulder land portion and opening outward to the tread surface in the tire lateral direction and a second end in communication with the fourth circumferential groove; and
 a first shoulder land portion sub lug groove provided between adjacent first shoulder land portion main lug grooves of the plurality of first shoulder land portion main lug grooves in the tire circumferential direction with a first end in communication with the fourth circumferential groove and a second end terminating inside the first shoulder land portion.

15. The pneumatic tire according to claim 14, further comprising:
 a second shoulder land portion formed outward of the first circumferential groove in the tire lateral direction with the first circumferential groove of the first circumferential groove and the second circumferential groove disposed outward in the tire lateral direction;
 a plurality of second shoulder land portion lug grooves each provided in the tire circumferential direction with a first end passing completely through the second shoulder land portion and opening outward to the tread surface in the tire lateral direction and a second end terminating inside the second shoulder land portion; and
 at least one lateral narrow groove intersecting the tire circumferential direction between adjacent second shoulder land portion lug grooves of the plurality of second shoulder land portion lug grooves in the tire circumferential direction.

16. The pneumatic tire according to claim 15, wherein the lateral narrow groove has a groove width not less than 0.4 mm and not greater than 1.5 mm.

\* \* \* \* \*